US009064422B2

(12) United States Patent
Mohn et al.

(10) Patent No.: US 9,064,422 B2
(45) Date of Patent: Jun. 23, 2015

(54) DATA TRANSMISSION FOR TRANSPORTATION MANAGEMENT

(71) Applicant: XRS Corporation, Eden Prairie, MN (US)

(72) Inventors: Charles Mohn, Edina, MN (US); Christopher A. Sekula, Mississauga (CA); Sarat Kakumanu, Eden Prairie, MN (US); Odell R. Tuttle, Minnetonka, MN (US); Daniel P. Fuglewicz, Getzville, NY (US); Peter S. Anderson, Minneapolis, MN (US); Thomas J. Martin, Jr., Oviedo, FL (US)

(73) Assignee: XRS CORPORATION, Eden Prairie, MN (US)

( * ) Notice: Subject to any disclaimer, the term of this patent is extended or adjusted under 35 U.S.C. 154(b) by 109 days.

(21) Appl. No.: 13/730,020

(22) Filed: Dec. 28, 2012

(65) Prior Publication Data
US 2014/0045427 A1 Feb. 13, 2014

Related U.S. Application Data

(60) Provisional application No. 61/682,004, filed on Aug. 10, 2012.

(51) Int. Cl.
G06Q 10/00 (2012.01)
G06F 17/00 (2006.01)
(Continued)

(52) U.S. Cl.
CPC ............... *G09B 5/00* (2013.01); *H04W 4/008* (2013.01); *G06F 17/00* (2013.01); *G06Q 30/018* (2013.01);
(Continued)

(58) Field of Classification Search
USPC ............................... 455/556.1, 566, 344, 345
See application file for complete search history.

(56) References Cited

U.S. PATENT DOCUMENTS 5,359,528 A 10/1994 Haendel et al.
5,612,875 A 3/1997 Haendel et al.
(Continued)

FOREIGN PATENT DOCUMENTS

KR 1020050038862 4/2005
KR 1020110011450 2/2011
WO 2007/022154 A2 2/2007

OTHER PUBLICATIONS

On Board Communications, SafetyTraks™ Web Application Guide, 2008, 17 pp. http://info.safetytraks.com/safetytraksusersmanual.pdf.
(Continued)

*Primary Examiner* — Blane J Jackson
(74) *Attorney, Agent, or Firm* — Arent Fox LLP

(57) ABSTRACT

A portable wireless data transfer and display device includes a user interface, a communication module, a display, and a short-range wireless communication module configured to wirelessly receive vehicle data from a data acquisition device mounted inside a vehicle when in close proximity to the data acquisition device. The portable wireless data transfer and display device is configured to accept inputs of driver information from a user via the user interface and further includes a long-range wireless communication module configured to send the vehicle data and the driver information through the communication module in real-time or at intervals that approximate real-time to a remote network device via a long-range wireless network. The portable wireless data transfer and display device is further configured to present at least one of: the vehicle data, the driver information, processed data, driver communications to the user via the display.

20 Claims, 18 Drawing Sheets

(51) Int. Cl.
| | |
|---|---|
| *G09B 5/00* | (2006.01) |
| *H04W 4/00* | (2009.01) |
| *G06Q 30/00* | (2012.01) |
| *H04L 29/08* | (2006.01) |
| *G06F 3/0484* | (2013.01) |
| *G08G 1/00* | (2006.01) |
| *G07C 5/00* | (2006.01) |
| *G09B 19/16* | (2006.01) |
| *G07C 5/08* | (2006.01) |
| *G07C 7/00* | (2006.01) |

(52) U.S. Cl.
CPC .............. *H04L 67/12* (2013.01); *G06F 3/0484* (2013.01); *G08G 1/00* (2013.01); *G07C 5/00* (2013.01); *G08G 1/20* (2013.01); *G09B 19/167* (2013.01); *G07C 5/0858* (2013.01); *G07C 7/00* (2013.01)

(56) References Cited

U.S. PATENT DOCUMENTS

| | | | |
|---|---|---|---|
| 5,694,322 | A | 12/1997 | Westerlage et al. |
| 5,953,319 | A | 9/1999 | Dutta et al. |
| 5,970,481 | A | 10/1999 | Westerlage et al. |
| 6,317,668 | B1 | 11/2001 | Thibault |
| 6,421,590 | B2 | 7/2002 | Thibault |
| 6,639,898 | B1 | 10/2003 | Dutta et al. |
| 6,714,857 | B2 | 3/2004 | Kapolka et al. |
| 6,904,363 | B2 | 6/2005 | Inbar et al. |
| 6,938,099 | B2 | 8/2005 | Morton et al. |
| 6,947,737 | B2 | 9/2005 | Massie et al. |
| 7,024,199 | B1 | 4/2006 | Massie et al. |
| 7,043,365 | B2 | 5/2006 | Inbar et al. |
| 7,068,992 | B1 | 6/2006 | Massie et al. |
| 7,089,322 | B1 | 8/2006 | Stallmann |
| 7,117,075 | B1 | 10/2006 | Larschan et al. |
| 7,136,642 | B1 | 11/2006 | Massie et al. |
| 7,162,238 | B1 | 1/2007 | Massie et al. |
| 7,230,944 | B1 | 6/2007 | Massie et al. |
| 7,401,741 | B2 | 7/2008 | Thayer |
| 7,784,707 | B2 | 8/2010 | Witty et al. |
| 7,802,729 | B2 | 9/2010 | Thayer |
| 8,248,223 | B2 | 8/2012 | Periwal |
| 8,442,508 | B2 | 5/2013 | Harter et al. |
| 8,626,568 | B2 | 1/2014 | Warkentin et al. |
| 8,682,356 | B2 | 3/2014 | Poe et al. |
| 2002/0032018 | A1 | 3/2002 | Morton et al. |
| 2002/0035421 | A1 | 3/2002 | Warkentin |
| 2002/0160771 | A1 | 10/2002 | Massie et al. |
| 2004/0039526 | A1 | 2/2004 | Inbar et al. |
| 2004/0162844 | A1 | 8/2004 | Thome et al. |
| 2005/0209778 | A1 | 9/2005 | Inbar et al. |
| 2006/0040239 | A1 | 2/2006 | Cummins et al. |
| 2006/0184613 | A1 | 8/2006 | Stienessen et al. |
| 2007/0038338 | A1 | 2/2007 | Larschan et al. |
| 2007/0038343 | A1 | 2/2007 | Larschan et al. |
| 2007/0038347 | A1 | 2/2007 | Larschan et al. |
| 2007/0038348 | A1 | 2/2007 | Larschan et al. |
| 2007/0038349 | A1 | 2/2007 | Larschan et al. |
| 2007/0038350 | A1 | 2/2007 | Larschan et al. |
| 2007/0038351 | A1 | 2/2007 | Larschan et al. |
| 2007/0038352 | A1 | 2/2007 | Larschan et al. |
| 2007/0038353 | A1 | 2/2007 | Larschan et al. |
| 2007/0050108 | A1 | 3/2007 | Larschan et al. |
| 2007/0267473 | A1 | 11/2007 | Thayer |
| 2007/0267509 | A1 | 11/2007 | Witty et al. |
| 2008/0269978 | A1 | 10/2008 | Shirole et al. |
| 2009/0051510 | A1 | 2/2009 | Follmer et al. |
| 2010/0088163 | A1 | 4/2010 | Davidson et al. |
| 2010/0210212 | A1 | 8/2010 | Sato |
| 2011/0125663 | A1 | 5/2011 | Kraft |
| 2012/0065815 | A1 | 3/2012 | Hess |
| 2012/0253888 | A1* | 10/2012 | Davidson ..................... 705/7.38 |
| 2012/0295230 | A1 | 11/2012 | Esposito |
| 2013/0006715 | A1 | 1/2013 | Warkentin et al. |
| 2013/0304276 | A1* | 11/2013 | Flies ................................. 701/1 |
| 2014/0045147 | A1 | 2/2014 | Mohn et al. |
| 2014/0045428 | A1 | 2/2014 | Mohn et al. |
| 2014/0045429 | A1 | 2/2014 | Mohn et al. |
| 2014/0046531 | A1 | 2/2014 | Mohn et al. |
| 2014/0046569 | A1 | 2/2014 | Mohn et al. |
| 2014/0046570 | A1 | 2/2014 | Mohn et al. |
| 2014/0046710 | A1 | 2/2014 | Mohn et al. |
| 2014/0047343 | A1 | 2/2014 | Mohn et al. |
| 2014/0047347 | A1 | 2/2014 | Mohn et al. |
| 2014/0058802 | A1 | 2/2014 | Warkentin et al. |

OTHER PUBLICATIONS

On Board Communications, FleetTraks™ Web Application Guide, 2007, 36 pp. http://www.onboardcommunications.com/2007%20Web%20Application%20User%20Guide.pdf.

On Board Communications, Web Application Guide, 2008, 38 pp. http://www.dtegps.com/2008_Web_Application_User_Guide.pdf.

Department of Transportation, Rules and Regulations, Federal Register Part II, vol. 75, No. 64, Apr. 5, 2010, 46 pp.

'On-Board Technology—Performance Management' [online]. J.J. Keller's Encompass, J.J. Keller & Associates, Inc., 2010 [retrieved on Jul. 22, 2011], 2 pp. http://www.kellerencompass.com/online/onboard_rec/index.aspx.

Turnpike Global Technologies, Driver's Manual 3.5—for Motorola Phone, cited by examiner in U.S. Appl. No. 13/174,331 on Nov. 21, 2012 http://xrscorp.com/media/docs/drivers-manual-motorola.pdf.

EOBR testimonial from Intermodal C&K Trucking, for Xata Turnpike, Youtube, Uploaded by XataNation on Jun. 29, 2011, 2 pp. http://www.youtube.com/watch?v=Xg4y5KauJiO.

tpMobile—Android Apps on Google Play, Google Play Webpages, Apr. 2011, 1 p. https://play.google.com/store/apps/details?id=com.TPG.tpMobile&hl=en,.

EOBR Compliance on Android, Windows Mobile & Blackberry devices, by Xata Road, Youtube, uploaded by XataNation on May, 27 2011, 5 pp. http://www.youtube.com/watch?v=8XEC5ALV7uE&feature=bf_prev&list=PL6CEE0D5DF5454180.

Fleet Management and EOBR—XATA Turnpike on Verizon, Youtube, uploaded by XataNation on Jun. 29, 2011, 1 p. http://www.youtube.com/watch?v=t-_zsdixC20&feature=BFa&list=PL6CEE0D5DF5454180.

EOBR Rules made easy with Xata Road Science, Youtube, uploaded by XataNation on May 5, 2011, 1 p. .http://www.youtube.com/watch?v=HIN61H9MABs&feature=bf_next&list=PL6CEEOD5DF5454180.

EOBR Install, Xata Turnpike Routetracker, Youtube, uploaded by XataNation on Jul. 21, 2011, 1 p. http://www.youtube.com/watch?v=67mGY_5CYTE&feature=bf_next&list=PL6CEE0D5DF5454180.

XATA—XRS Nation Fleet Management, Overview of posted videos, Youtube, Apr. 2011-2012, 1 p.

Xata tp mobile driver handbook for windows mobile, in U.S. Appl. No. 13/174,331 on Nov. 21, 2012, 16 pp. http://xrscorp.com/media/docs/drivers-manual-windows-mobile.pdf.

Xata tp mobile driver handbook for android, in U.S. Appl. No. 13/174,331 on Nov. 21, 2012, 17 pp. http://xrscorp.com/media/docs/drivers-manual-android.pdf.

Pritchett Trucking Inc. Renews Contract for Mobile Max by Xata, Xata Webpages Mar. 16, 2010, 2 pp. http://xatadev2,firebrandmg.com/news-news-press-releases-events-and-investor-news/2010/16-march/.

Predestination Transportation Chooses XATA for Fleet Management, Xara Webpages Mar. 12, 2010, 2 pp. http://xatadev2.firebrandmg.com/news/news-press-releases-events-and-investor-news/2010/12-march/.

XATA and SpeedGauge Partner to Provide Enhanced Speed Data for Increased Safety, Xata webpages, Mar. 4, 2010, 2 pp. http://xatadev2.firebrandmg.com/news/news-press-releases-events-and-investor-news/2010/4-march/.

(56) References Cited

OTHER PUBLICATIONS

TREQ-M4, Mobile Data Terminal Manual, Beijer Electronics, M01-003-00 Rev 02, Mar. 23, 2011, 98 pp. http://www.beijerelectronicsinc.com/pdf/qsi_qsi_treq-m4_user_manual.pdf.
OnBoard Communications, OBC9000™ Installation Manual, in U.S. Appl. No. 13/174,331 on Nov. 21, 2012, 11 pp. http://www.onboardcommunications.com/instaii/OBC9000_Install.pdf.
Winn-Dixie Enhances 450-Truck Fleet with XATANET, Xata webpages, Apr. 21, 2011, 1 p. http://xatadev2.firebrandmg.com/news/news-press-releases-events-and-inventor-news/2010/21-April/.
Turnpike Global Technologies, PowerPoint presentation: Introduction, publicly available before Jun. 30, 2010, 13 pp.
Turnpike Global Technologies, Route Tracker Installation Guide Version 1.0, publicly available before Jun. 30, 2010, 7 pp.
Turnpike Global Technologies, Automating the Transportation Industry, publicly available before Jun. 30, 2010, 4 pp.
Turnpike Global Technologies, PowerPoint presentation: Trucking and Technology, publicly available before Jun. 30, 2010, 10 pp.
Turnpike Global Technologies, PowerPoint presentation: Turnpike Global Technologies, Corporate overview, publicly available before Jun. 30, 2010, 23 pp.
Turnpike Global Technologies, PowerPoint presentation: Turnpike Global Technologies, RouteTracker, publicly available before Jun. 30, 2010, 25 pp.
Turnpike Global Technologies, PowerPoint presentation: Turnpike Direct Sprint Sales Intro Jan. 2008, 18 pp.
International Search Report and Written Opinion of international application No. PCT/US2012/044772, dated Jan. 21, 2013, 10 pp.
J.J. Keller's Encompass, "Phone & Hardware Requirements," May 5, 2011, 1 pp.
"OBD II to USB cable pinout," elmelectronics.com, retrieved from http://pinoutsguide.com/CarElectronics/obd_ii_usb_cable_pinout.shtml on Feb. 26, 2014, 2 pp.
Office Action from U.S. Appl. No. 13/729,951, dated Mar. 21, 2014, 23 pp.
Response to Office Action dated Mar. 21, 2014, from U.S. Appl. No. 13/729,951, filed Jul. 21, 2014, 12 pp.
Response to Office Action dated Mar. 24, 2014, from U.S. Appl. No. 13/729,987, filed Jul. 22, 2014, 9 pp.
Final Office Action from U.S. Appl. No. 13/729,951, dated Aug. 8, 2014, 21 pp.
Final Office Action from U.S. Appl. No. 13/729,987, dated Aug. 8, 2014, 16 pp.
Amendment in Response to Final Office Action dated Aug. 8, 2014, from U.S. Appl. No. 13/729,951, filed Nov. 10, 2014, 12 pp.
Amendment in Response to Final Office Action dated Aug. 8, 2014, from U.S. Appl. No. 13/729,987, filed Nov. 10, 2014, 10 pp.
Office Action from U.S. Appl. No. 13/729,987, Mar. 24, 2014, 17 pp.

\* cited by examiner

FIG. 13

DATA TRANSMISSION FOR TRANSPORTATION MANAGEMENT

This application claims the benefit of U.S. Provisional Application No. 61/682,004, filed Aug. 10, 2012, the entire contents of which is incorporated herein by reference.

TECHNICAL FIELD

This disclosure relates to techniques for transportation management, and in particular, but without limitation, techniques for shipping and fleet management.

BACKGROUND

Fleet vehicle operators have an interest in keeping track of the vehicles and shipments, for compliance with governmental regulations as well as monitor the performance and well-being of their drivers. Fleet vehicles may be equipped with devices that are configured to track the vehicles' geographic locations, speeds, headings, cargo, cargo temperature, engine performance parameters, and other data. Such information is used, for example, to maintain the vehicles, estimate delivery times, provide warning of possible damage to cargo, and to evaluate driver performance.

Collection of fleet vehicle information may also be useful to produce records for compliance with governmental regulations or company requirements. As examples, such records may include the number of miles a delivery vehicle has traveled since its last safety inspection and the number of hours a driver has been on duty since he or she last rested. This information was traditionally recorded on paper, e.g., driver log books, or in proprietary electronic formats. In either case, ensuring compliance with governmental regulations or company requirements may be time consuming and such information may be inconvenient to access or share with regulatory inspectors or other third parties.

SUMMARY

This disclosure describes a number of techniques for communicating fleet vehicle information. Such techniques may utilize equipment for use inside a fleet vehicle to facilitate prompt and efficient transfer of vehicle data and driver information. Such techniques may further include generating electronic reports that provide one or more of: driver information, hours of service information, and vehicle data. The electronic reports may be readily communicated to a remote network device in a number of different manners. For example, a system may include a data acquisition device mountable in a vehicle and a portable wireless data transfer and display device, e.g., a cellular phone, that is configured to provide short-range, two-way wireless communication, e.g., Bluetooth communication, with the data acquisition device. In some examples, the portable wireless data transfer and display device may export the electronic information to the remote device via a long-range wireless connection, such as cellular link to facilitate real-time or approximately real-time tracking of driver and vehicle information by the remote device.

In one example, this disclosure is directed to a system comprising a data acquisition device configured to mount inside a vehicle and provide a wired connection to the vehicle for gathering vehicle data from the vehicle during operation of the vehicle, the data acquisition device being free of a user interface display, a portable wireless data transfer and display device, and a remote network device. The data acquisition device includes a first short-range wireless communication module configured to wirelessly transmit, at predetermined times, the vehicle data to the portable wireless data transfer and display device. The portable wireless data transfer and display device includes a second short-range wireless communication module configured to wirelessly receive the vehicle data from the data acquisition device, in real-time or at intervals that approximate real-time, when the data acquisition device is mounted in the vehicle and the portable wireless data transfer and display device is in close proximity to the vehicle, a communication module configured to provide a communication link with the remote network device via a long-range wireless network, a user interface configured to receive driver information from a first user and to present at least one of the vehicle data, the driver information, the communication information, an summary electronic reports to the first user via a first display. The remote network device is configured to receive the vehicle data, the driver information, the communication information, and the driver summary electronic report at predetermined times from the portable wireless data transfer and display device, and present at least one of the vehicle data, the driver information, the communication information, and the summary electronic report to a second user via second display.

In another example, this disclosure is directed to a system comprising a means for gathering vehicle data from a vehicle during operation of the vehicle, a means for wirelessly receiving the vehicle data from the means gathering vehicle data in real-time or at intervals that approximate real-time, and a remote network device configured to receive the vehicle data from the means for wirelessly receiving the vehicle data and present the vehicle data to a user.

In another example, this disclosure is directed to a data acquisition device comprising a wired module configured to provide a wired connection to a vehicle for gathering vehicle data from the vehicle during operation of the vehicle. The data acquisition device is configured to be mounted inside the vehicle, and a short-range wireless communication module configured to wirelessly send the vehicle data in real-time to a portable wireless data transfer and display device in close proximity to the data acquisition device during operation of the vehicle.

In another example, this disclosure is directed to a device comprising a means for gathering vehicle data from the vehicle during operation of the vehicle, and a means for wirelessly sending the vehicle data in real-time to a portable wireless data transfer and display device during operation of the vehicle.

In another example, this disclosure is directed to a portable wireless data transfer and display device comprising a user interface, a communication module, a display, a short-range wireless communication module configured to wirelessly receive vehicle data from a data acquisition device mounted inside a vehicle when in close proximity to the data acquisition device. The portable wireless data transfer and display device is configured to accept inputs of driver information from a user via the user interface, and a long-range wireless communication module configured to send the vehicle data and the driver information through the communication module in real-time or at intervals that approximate real-time to a remote network device via a long-range wireless network. The portable wireless data transfer and display device is further configured to present at least one of the vehicle data, the driver information, processed data, and driver communications to the user via the display.

In another example, this disclosure is directed to a device comprising a means for wirelessly receiving vehicle data from a data acquisition device mounted inside a vehicle when in close proximity to the data acquisition device, a means for accepting inputs of driver information from a user, a means for sending the vehicle data and the driver information through the communication module in real-time or at intervals that approximate real-time to a remote network device via a long-range wireless network, and a means for presenting at least one of the vehicle data, the driver information, processed data, driver communications to the user.

In another example, this disclosure is directed to a network device comprising a memory, a processor, a display, and a network communication module configured to receive vehicle data, driver information, and driver communications, at pre-determined times, from at least one portable wireless data transfer and display device via a long-range wireless network. The memory configured to store the vehicle data, the driver information, and the driver communications. The processor is configured to process at least one of the vehicle data, the driver information, and the driver communication into summary electronic reports. The network device is configured to send the vehicle data, the driver information, the driver communication, and the summary electronic reports via the network communication module to at least one portable wireless data transfer and display device via the long-range wireless network. The network device is configured to present the vehicle data, driver information, driver communication, driver summary electronic report to a user via the display. The network device is configured to remotely update of at least one portable wireless data transfer and display device or at least one data acquisition devices associated with a portable wireless data transfer and display device via the network communication module.

In another example, this disclosure is directed to a network device comprising a means for receiving vehicle data, driver information, and driver communications, at pre-determined times, from at least one portable wireless data transfer and display device via a long-range wireless network, a means for processing at least one of the vehicle data, the driver information, and the driver communication into summary electronic reports, a means for sending the vehicle data, the driver information, the driver communication, and the summary electronic reports to at least one portable wireless data transfer and display device via the long-range wireless network, a means for presenting the vehicle data, driver information, driver communication, driver summary electronic report to a user, and a means for remotely updating of at least one portable wireless data transfer and display device or at least one data acquisition devices associated with a portable wireless data transfer and display device.

In another example, this disclosure is directed to a method comprising receiving vehicle data, driver information, and driver communications, at pre-determined times, from at least one portable wireless data transfer and display device via a long-range wireless network, processing at least one of the vehicle data, the driver information, and the driver communication into summary electronic reports, sending the vehicle data, the driver information, the driver communication, and the summary electronic reports to at least one portable wireless data transfer and display device via the long-range wireless network, presenting the vehicle data, driver information, driver communication, driver summary electronic report to a user, and remotely updating of at least one portable wireless data transfer and display device or at least one data acquisition devices associated with a portable wireless data transfer and display device.

In another example, this disclosure is directed to a portable wireless data transfer and display device comprising a user interface, a communication module, a display, a short-range wireless communication module configured to wirelessly receive vehicle data from a data acquisition device mounted inside a vehicle when in close proximity to the data acquisition device. The portable wireless data transfer and display device is configured to accept inputs of driver information from a user via the user interface. The portable wireless data transfer and display device is configured to associate the inputs of driver information with the vehicle data, and a long-range wireless communication module configured to send the vehicle data and the driver information, and the association of the vehicle data and the driver information through the communication module to a remote network device via a long-range wireless network. The portable wireless data transfer and display device is further configured to present at least one of the vehicle data, the driver information, processed data, and driver communications to a user via the display.

In another example, this disclosure is directed to a system comprising a data acquisition device configured to mount inside a vehicle and provide a wired connection to the vehicle for gathering vehicle data from the vehicle during operation of the vehicle, the data acquisition device being free of a user interface display, a portable wireless data transfer and display device, and a remote network device. The data acquisition device includes a first short-range wireless communication module configured to wirelessly transmit the vehicle data to the portable wireless data transfer and display device. The portable wireless data transfer and display device includes a second short-range wireless communication module configured to wirelessly receive the vehicle data from the data acquisition device when the data acquisition device is mounted in the vehicle and the portable wireless data transfer and display device is in close proximity to the vehicle. The portable wireless data transfer and display device is configured to accept inputs of driver information from a first user via a user interface. The portable wireless data transfer and display device is configured to associate the inputs of driver information with the vehicle data. The portable wireless data transfer and display device further includes a long-range wireless communication module. The portable wireless data transfer and display device is configured to send the vehicle data and the driver information, and the association of the vehicle data and the driver information through the communication module to a remote network device via a long-range wireless network. The remote network device is configured to receive the vehicle data and the driver information, and the association of the vehicle data and the driver information from the portable wireless data transfer and display device, and present at least one of the vehicle data, and the association of the vehicle data and the driver information to a second user via second display.

In another example, this disclosure is directed to a portable wireless data transfer and display device comprising a user interface, a communication module, a display, a short-range wireless communication module configured to wirelessly receive vehicle data from a data acquisition device mounted inside a vehicle when in close proximity to the data acquisition device. The portable wireless data transfer and display device is configured to accept inputs of driver information from a user via the user interface, and a long-range wireless communication module configured to send the vehicle data and the driver information through the communication module at predetermined times to a network device via a long-range wireless network, and to receive one or more work requests from the network device via the long-range wireless network. The portable wireless data transfer and display device is configured to present the work request via the display and to accept an input from a driver responding to the work request via the user interface. The portable wireless data transfer and display device is configured to forward the input from the driver responding to the work request to the network device via the long-range wireless communication module and the long-range wireless network.

In another example, this disclosure is directed to a device comprising a means for wirelessly receiving vehicle data from a data acquisition device mounted inside a vehicle when in close proximity to the data acquisition device, a means for accepting inputs of driver information from a user, a means for sending the vehicle data and the driver information through the communication module to a remote network device via a long-range wireless network, a means for receiving one or more work requests from the network device via the long-range wireless network, a means for receiving an input from a driver responding to the work request, and a means for forwarding the input from the driver responding to the work request to the network device via the long-range wireless network In another example, this disclosure is directed to a portable wireless data transfer and display device comprising a user interface, a display, a processor, and a short-range wireless communication module configured to wirelessly receive vehicle data, in real-time, from a data acquisition device mounted inside a vehicle when in close proximity to the data acquisition device. The portable wireless data transfer and display device is configured to receive an input of driver information and driver communications from a user via the user interface. The short-range wireless communication module is configured to communicate two ways, in real-time, the driver communications via a long-range wireless network. The portable wireless data transfer and display device is configured to process into a trip schedule at least one of the vehicle data, the driver information, and the driver communications via the processor. The portable wireless data transfer and display device is further configured to present the trip schedule and the driver communications to the user via the display.

In another example, this disclosure is directed to a device comprising a means for wirelessly receiving vehicle data from a data acquisition device mounted inside a vehicle when in close proximity to the data acquisition device, a means for accepting inputs of driver information from a user, a means for sending the vehicle data and the driver information through the communication module to a remote network device via a long-range wireless network, a means for receiving an input of driver information and driver communications from a user, a means for processing, into a trip schedule, at least one of the vehicle data, the driver information, and the driver communications, and a means for presenting, in real-time, the trip schedule and the driver communications to the user.

In another example, this disclosure is directed to a network device comprising a memory, a display, a processor, and a network communication module configured to receive vehicle data, driver information, and driver communications, at pre-determined times, from a plurality of portable wireless data transfer and display device via a long-range wireless network, each portable wireless data transfer and display device being associated with a corresponding one of a plurality of vehicles. The memory configured to store the vehicle data, the driver information, and the driver communications. The processor is configured to process at least one of the vehicle data, the driver information, and the driver communication into summary electronic reports. The network device is configured to present the vehicle data, the driver information, the driver communication, and the summary electronic report of the plurality of vehicles in real-time by location via the display. The network device is configured to allow for selection of the drivers presented and is configured to send work requests to wireless devices in use by the selection of the drivers presented.

In another example, this disclosure is directed to a network device comprising a means for receiving vehicle data, driver information, and driver communications, at pre-determined times, from a plurality of portable wireless data transfer and display devices, each portable wireless data transfer and display device being associated with a corresponding one of a plurality of vehicles, via a long-range wireless network, a means for storing the vehicle data, the driver information, and the driver communications, a means for processing at least one of the vehicle data, the driver information, and the driver communication into summary electronic reports, a means for presenting the vehicle data, the driver information, the driver communication, and the summary electronic report of the plurality of vehicles in real-time by location, a means for receiving a selection of the drivers presented, and a means for sending work requests to wireless devices in use by the selection of the drivers presented.

In another example, this disclosure is directed to a network device comprising a memory, a display, a user interface, a network communication module configured to receive vehicle data, driver information, and driver communications, at pre-determined times, from a plurality of portable wireless data transfer and display devices via a long-range wireless network. The network communication module is further configured to receive a network communication from one or more of the portable wireless data transfer and display devices via the long-range wireless network. The network device is configured to store the vehicle data, the driver information, the driver communication, and the network communication in the memory. The network device is configured to present the vehicle data, the driver information, the driver communication, and the network communications from the plurality of portable wireless data transfer and display devices via the display. The user interface is configured to allow for selection of the drivers presented and is configured to accept user inputs of network communications via the user interface. The network communication module is further configured to send the network communications to the plurality of portable wireless data transfer and display devices via the long-range wireless network.

In another example, this disclosure is directed to a network device comprising a means for receiving vehicle data, driver information, and driver communications, at pre-determined times, from a plurality of portable wireless data transfer and display devices via a long-range wireless network, a means for receiving a network communication from one or more of the portable wireless data transfer and display devices via the long-range wireless network, a means for storing the vehicle data, the driver information, the driver communication, and the network communication, a means for presenting the vehicle data, the driver information, the driver communication, and the network communications from the plurality of portable wireless data transfer and display devices, a means for accepting user inputs of network communications, and a means for sending the network communications to the plurality of portable wireless data transfer and display devices via the long-range wireless network.

In another example, this disclosure is directed to a method comprising receiving vehicle data, driver information, and driver communications, at pre-determined times, from a plurality of portable wireless data transfer and display devices via a long-range wireless network, receiving a network communication from one or more of the portable wireless data transfer and display devices via the long-range wireless network, storing the vehicle data, the driver information, the driver communication, and the network communication, presenting the vehicle data, the driver information, the driver communication, and the network communications from the plurality of portable wireless data transfer and display devices, accepting user inputs of network communications, and sending the network communications to the plurality of portable wireless data transfer and display devices via the long-range wireless network.

In another example, this disclosure is directed to a computing device comprising a user interface, a network interface configured to receive vehicle data, driver information, and driver communications, a memory configured to store the vehicle data, the driver information, and the driver communications, and a processor configured to process the vehicle data, the driver information, and the driver communications into an electronic driver scorecard according to specified safety and efficiency criteria. The electronic driver scorecard comprises one or more alphanumerical ratings according to a selection of drivers as input by a user into the user interface.

In another example, this disclosure is directed to a computing device comprising a means for receiving vehicle data, driver information, and driver communications, a means for storing the vehicle data, the driver information, and the driver communications via memory, and a means for processing the vehicle data, the driver information, and the driver communications into an electronic driver scorecard according to specified safety and efficiency criteria via the processor. The electronic driver scorecard comprises one or more alphanumerical ratings according to a selection of drivers as selected by a user.

In another example, this disclosure is directed to a method comprising receiving vehicle data and driver information with a network interface of a computing device, storing the vehicle data and the driver information with a memory of the computing device, and processing the vehicle data and the driver information into an electronic driver scorecard according to specified safety and efficiency with a processor of the computing device. The electronic driver scorecard comprises one or more alphanumerical ratings according to a selection of drivers as input by a user into a user interface of the computing device.

The details of one or more implementations are set forth in the accompanying drawings and the description below. Other features and advantages may be apparent from the description and drawings, and from the claims.

BRIEF DESCRIPTION OF THE DRAWINGS

FIG. 13 illustrates a user interface of a network device presenting a detailed driving log for a selected driver.

DETAILED DESCRIPTION

Figure 1:
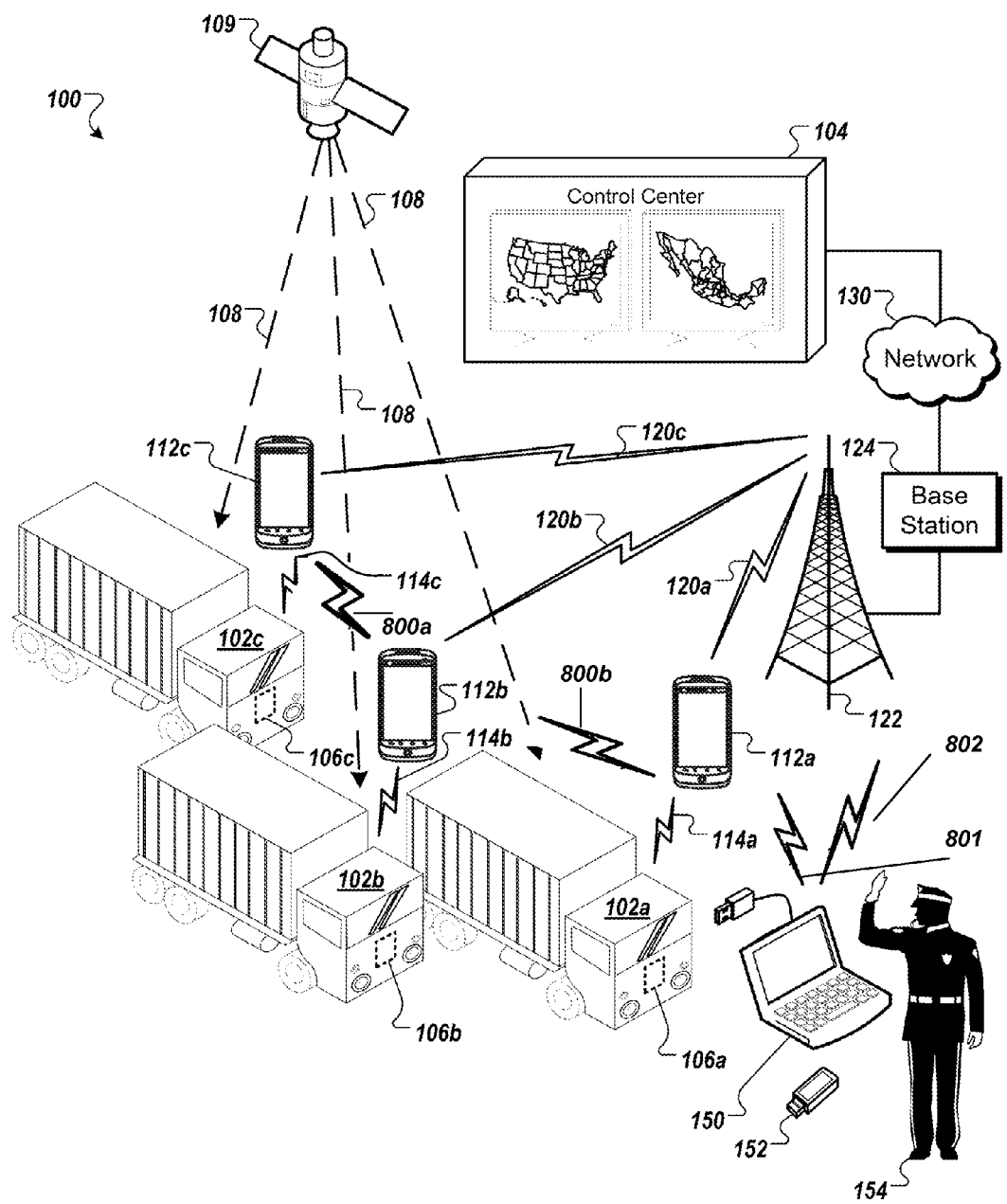
FIG. 1 is a conceptual illustration of an example a fleet management system.

FIG. 1 illustrates example fleet management system 100. Fleet management system 100 includes a collection of vehicles 102a-102c equipped with data acquisition devices 106a-106c and accompanying portable wireless data transfer and display devices 112a-112c. In particular, examples, portable wireless data transfer and display devices 112a-112c may be cellular phones or other commercially available long-range wireless communication devices. Fleet management system 100 further includes control center 104, which facilitates remote monitoring of vehicles 102a-102c.

Data acquisition devices 106a-106c are configured to mount inside vehicles 102a-102c and provide a connection to the vehicles for gathering vehicle data from the vehicle during operation of the vehicle. This vehicle data may then be forwarded to the corresponding data transfer and display devices 112a-112c. Portable wireless data transfer and display devices 112a-112c each include a user interface, which may be used to receive information from the driver and/or present vehicle information to the driver. The user interfaces of the portable wireless data transfer and display devices may be configured to present at least one of: the vehicle data, the driver information, the driver communications, or a driver summary electronic report.

Portable wireless data transfer and display devices 112a-112c communicate with a remote network device of control center 104. Control center 104 represents a physical or conceptual location in which vehicle information about vehicles 102a-102c, along with the vehicle's driver information, their driver communications, and driver summary electronic reports of their work history, is collected and used.

Remote control center 104 is configured to receive the vehicle data, the driver information, the communication information, and the driver summary electronic report, at predetermined times, such as at real-time or at intervals that approximate real-time, from portable wireless data transfer and display devices 112a-112c through long-range network 120a-120c. The network device then presents at least one of the vehicle data, the driver information, the communication information and the summary electronic report to a user via a display.

As mentioned previously, data acquisition devices 106a-106c are electronic devices that collect vehicle data about vehicles' 102a-102c, such as location, speed, operational parameters, acceleration, operating hours, and/or other vehicle-related information. For example, data acquisition devices 106a-106c may receive location information such as global positioning system (GPS) signals 108 from GPS satellites 109 to determine the locations of their respective vehicles 102a-102c. Also, data acquisition device 106a-106c may be configured to electrically connect with an engine control module (refer to FIG. 2) so as to receive vehicle operation information, e.g., speed, operational parameters, acceleration/braking data, fuel usage, and the like, for storage within a memory module and through usage of devices such as accelerometers.

In some examples, the connection to the vehicle may be a wired connection; in other examples, the connection to the vehicle may be a wireless connection. Periods of operation of the vehicle may include periods when the vehicle is in motion, idle or while any electronic component of the vehicle is active. In some examples, data acquisition devices 106a-106c may be free of a user interface display altogether. Instead, data acquisition devices 106a-106c may interact with a user, such as a driver, via one of portable wireless data transfer and display devices 112a-112c.

In some examples, each data acquisition device 106 includes a short-range wireless communication module configured to wirelessly transmit vehicle data to a corresponding portable wireless data transfer and display device 112. The vehicle data may be transmitted at predetermined times, such as at real-time or at intervals that approximate real-time, e.g., intervals of less than 5 minutes, less than 3 minutes, less than 2 minutes, less than 1 minute or even less than 30 seconds. Likewise, the portable wireless data transfer and display devices 112a-112c may include a short-range wireless communication modules configured to wirelessly receive the vehicle data from a corresponding data acquisition device 106. This may occur at predetermined times, such as at real-time or at intervals that approximate real-time, when the data acquisition device is mounted in the vehicle and the portable wireless data transfer and display device is in close proximity to the vehicle. In other examples, communications between a data acquisition device and a portable wireless data transfer and display device may occur over a wired connection, such as a connection conforming to a universal serial bus (USB) standard, such as USB 1.1, USB 2.0. USB 3.0 or other wired connection. The portable wireless data transfer and display devices also include a communication module configured to provide a communication link with the remote network device via long-range wireless network 120a-120c.

Still referring to FIG. 1, each of data acquisition device 106a-106c may communicate with a corresponding portable wireless data transfer and display device 112a-112c, at predetermined times, such as at real-time or at intervals that approximate real-time, using a short-range wireless communication module, which may also be positioned inside or in close proximity to vehicle 102a-102c. These signals are received by the portable wireless data transfer and display devices through the devices own short-range wireless network communication modules. In particular, each of portable wireless data transfer and display devices 112a-112c may be carried by the driver of the corresponding vehicle 102a-102c.

Each portable wireless data transfer and display device 112a-112c is configured to wirelessly communicate with a corresponding data acquisition device 106a-106c, respectively, mounted in the vehicle while the driver is operating the vehicle. For example, during use of fleet vehicle 102a, data acquisition device 106a and portable wireless data transfer and display device 112a may wirelessly communicate while both data acquisition device 106a and portable wireless data transfer and display device 112a are positioned inside vehicle 102a. In such circumstances, data acquisition device 106a and the corresponding portable wireless data transfer and display device 112a may operate as system 110a (FIGS. 2-3) for communicating information about vehicle 102a and its driver.

Still referring to FIG. 1, in this example, data acquisition device 106a communicates with portable wireless data transfer and display device 112a over short-range wireless link 114a. Portable wireless data transfer and display device 106a provides a user interface for data acquisition device 106a. Similarly, data acquisition devices 106b and 106c communicate with portable wireless data transfer and display devices 112b and 112c, respectively, over a short-range wireless links 114b and 114c. In those examples in which portable wireless data transfer and display device 112a-112c provides the user interface for the respective data acquisition device 106a-106c, each data acquisition device 106a-106c may be constructed as a displayless unit that is free of any user interface display mounted thereto, thereby reducing the size of data acquisition device 106a, e.g., providing for simplified installation and, optionally, concealed installation inside the vehicle, and reducing the manufacturing complexities for data acquisition device 106a. In some implementations, portable wireless data transfer and display devices 112a-112c may be cellular telephones, satellite telephones, portable computers, tablet computers, personal digital assistants (PDAs), or other mobile computing devices that are programmed to wirelessly communicate with one or more of data acquisition device 106a-106c. As such, each portable wireless data transfer and display device 112a-112c may be separately housed from its corresponding data acquisition device 106a-106c so that portable wireless data transfer and display device 112a-112c may be carried by the vehicle driver or other user outside of vehicle 102a-102c while data acquisition device 106a-106c remains mounted inside vehicle 102a-102c.

In some implementations, wireless links 114a-114c may be short-range wireless communications links, such as Bluetooth, wireless Ethernet (WiFi) including WiFi 802.11, ZigBee, near-field communications (NFC), infrared (IrDA), block linear turbo equalization (BLTE) or any other suitable short-range wireless communication link utilized by the short-range wireless communication modules utilized by the data acquisition devices and portable wireless data transfer and display devices.

In some examples, each portable wireless data transfer and display device 112a-112c may communicate two ways with an associated data acquisition devices 106a-106c. In such examples, the data acquisition device may receive the driver information from the portable wireless data transfer and display device, while the portable wireless data transfer and display device receives vehicle information from the data acquisition device. This may be done at predetermined times when both items are positioned inside vehicle 102a-102c, e.g., while data acquisition device 106a is mounted inside vehicle 102a and portable wireless data transfer and display device 112a is carried by the driver in the vehicle or otherwise temporarily placed inside the vehicle cabin. Moreover, because each portable wireless data transfer and display device 112a-112c is portable relative to its respective data acquisition device 106a-106c, the driver or other human user may view or input driver information on the user interface of portable wireless data transfer and display device 112a-112c both when the driver is seated inside the vehicle and when the driver is positioned outside the vehicle in proximity thereto, e.g., while inspecting the exterior of the vehicle, refueling, or sitting in a nearby building. Furthermore, even when the portable wireless data transfer and display device is outside the proximity thereto, the portable wireless data transfer and display device may still communicate wirelessly with remote control center 104 using a long-range wireless network 120a-120c and with other mobile communications devices using long-range wireless network 800a-800b.

In use, each wireless link 114a-114c transmits information between the respective data acquisition device 106a-106c and its corresponding portable wireless data transfer and display device 112a-112c. In some implementations, data acquisition devices 106a-106c do not provide their own user interfaces, e.g., displays, input buttons, but instead wirelessly communicate bi-directionally with portable wireless data transfer and display device 112a-112c to provide user interface functions for the overall mobile system 110a (refer, for example, to FIG. 2). For example, data acquisition device 106a may wirelessly communicate vehicle data through short range wireless link 114a so that portable wireless data transfer and display device 112a may update and display hours of service information on the display screen carried by the driver. In another example, data acquisition device 106a may determine the location of vehicle 102a and wirelessly communicate the location information to portable wireless data transfer and display device 112a so that portable wireless data transfer and display device 112a may display the location on a map. Example uses of portable wireless data transfer and display device 112a-112c as user interfaces for data acquisition device 106a-106c are discussed further in the descriptions of FIGS. 2-5.

In use, portable wireless data transfer and display devices 112a-112c may communicate with at least one control center 104 over a collection of wireless links 120a-120c with one or more transceivers 122. They may also communicate with one or more other portable wireless data transfer and display devices 112a-112c through long-range networks 800a-800b. Information that may be communicated among portable wireless data transfer and display devices and remote networks includes the vehicle data, the driver information, driver communications, and driver summary electronic reports. The driver summary electronic reports may include identification information for the driver, and hours of service information for the driver. This information may be viewed on the displays of the portable wireless data transfer and display devices. In some implementations, wireless links 120a-120c and 800a-800b may be short-range links, such as WiFi etc., or long-range wireless links, such as cellular communication links, satellite communication links, WiMAX links, long term evolution (LTE) links, or any other suitable form of long-range wireless link that may communicate data among portable wireless data transfer and display devices 112a-112c and control center 104.

In an example, transceiver 122 may be a cellular antenna tower that is configured to provide cellular data links to a variety of cellular telephones within a particular geographic range. Transceiver 122 may be communicatively connected to base station 124. In some implementations, base station 124 may be a cellular data communications provider, satellite communications provider, or any other appropriate wireless communications provider.

Still referring to FIG. 1, a network 130 communicatively connects base station 124 with control center 104. In some examples, network 130 may include the Internet or other public or private data networks. In alternative examples in which one or more of portable wireless data transfer and display device 112a-112c include a satellite phone, at least one of long-range wireless links 120a-120c may be a satellite communication link and transceiver 122 may be a satellite communication apparatus.

A mentioned previously, control center 104 exchanges information with data acquisition devices 106a-106c (via portable wireless data transfer and display devices 112a-112c) and the portable wireless data transfer and display devices monitor the status of vehicles 102a-102c and the drivers within. For example, control center 104 may track the locations of vehicles 102a-102c in order to estimate delivery or pickup times, or to coordinate the dispatch of vehicles 102a-102c to pick up a delivery, e.g., by dispatching vehicle 102a-102c closest to the pickup location. In another example, control center 104 may monitor vehicles' 102a-102c operating parameters to coordinate repairs or maintenance, e.g., monitor temperatures of refrigerated cargo, or monitor engine warning signals. Control center 104 may also receive or send information to portable wireless data transfer and display devices 114a-114c, including, but not limited to, vehicle data, driver information, communication information, and driver summary electronic reports, at predetermined times.

A remote network user may furthermore view this collection of information on a display screen of a remote device on network 130. The remote network user or control center 104 may find that certain portable wireless data transfer and display devices are out of date and may be configured to send electronic updates to portable wireless data transfer and display devices 112a-112c. Correspondingly, the portable wireless data transfer and display device may be configured to receive these updates and self-install them.

Another form of information generated by the system for communication to the network device is driver information, which may include data indicative of the hours of service when the driver is on duty on a particular day. In some implementations, the driver information may be automatically converted into driver summary electronic reports (including hours of service records, driver identification information, etc.) that are readily exportable via the USB port of data acquisition device 106a-106c (FIG. 3) or via wireless link 120a-120c of portable wireless data transfer and display device 112a-112c. In this example, these portable wireless data transfer and display devices may further relay information to each other through long-range networks 800a-800c or to control center 104 through long-range networks 120a-120c.

For example, data acquisition device 106a may collect the vehicle data over a period of time when a particular driver is using vehicle 102a, and data acquisition device 106a can, at predetermined times, such as at real-time or at intervals that approximate real-time, transfer this vehicle information to corresponding portable wireless data transfer and display device 112a linked thereto via Bluetooth connection 114a. Portable wireless data transfer and display device 112a may also access the driver information, either by input by the driver into the portable wireless data transfer and display device or by receiving driver information from another portable wireless data transfer and display device or control center 104. From there, the driver information may be wirelessly communicated via cellular link 120a to control center 104, wirelessly communicated via Bluetooth link 114a to data acquisition device 106a for subsequent exporting via the USB port to a remote device (refer to FIG. 3), wirelessly communicated via a cellular link to portable wireless data transfer and display device 112b-112c, wirelessly communicated to remote computer 150, or some combination of the aforementioned. Regarding the process for exporting vehicle data or driver information via the USB port, data acquisition device 106a may be configured to output the driver summary electronic report directly to a temporarily connected external computer device 150, e.g., a notebook computer, or a portable storage device 152, e.g., a USB thumb drive, a portable hard drive, provided by a vehicle inspector 154, e.g., a law enforcement official, a regulatory inspector, or the like. In such circumstances, the vehicle inspector 154 may conveniently plug the external computer device 150 or portable storage device 152 into the USB port provided by data acquisition device 106a to facilitate a transfer of the requested data from data acquisition device 106a. Thus, data acquisition device 106a and portable wireless data transfer and display device 112 are two separately housed instruments that act together as a system to generate and communicate the vehicle data and driver information associated with the driver. Additionally, external computer device 150 may acquire the requested data directly from portable wireless data transfer and display device 112a through network 801, or may receive the information from control center 104 through wireless network connection 802.

Communication among network devices, the data acquisition devices, the portable wireless display and transfer units, and other communication devices and computers may be configured to occur at predetermined times. In different examples, predetermined times may include consistent periodic intervals, real-time communication, and times corresponding to particular events such as: driver events, communication events, vehicle events, safety events, remote network device events, data acquisition device events, and portable wireless display and transfer unit events. Additionally, predetermined times may include times such as when the portable wireless data transfer and display device is connected to the long-range wireless network, and periodical intervals when the portable wireless data transfer and display device is connected to the long-range wireless network. This facilitates real-time or approximately real-time updates of driver and vehicle data at a remote computing device via control center 104. This may improve transportation management by improving the reliability and accuracy of driver and vehicle information available via control center 104.

Figure 2:
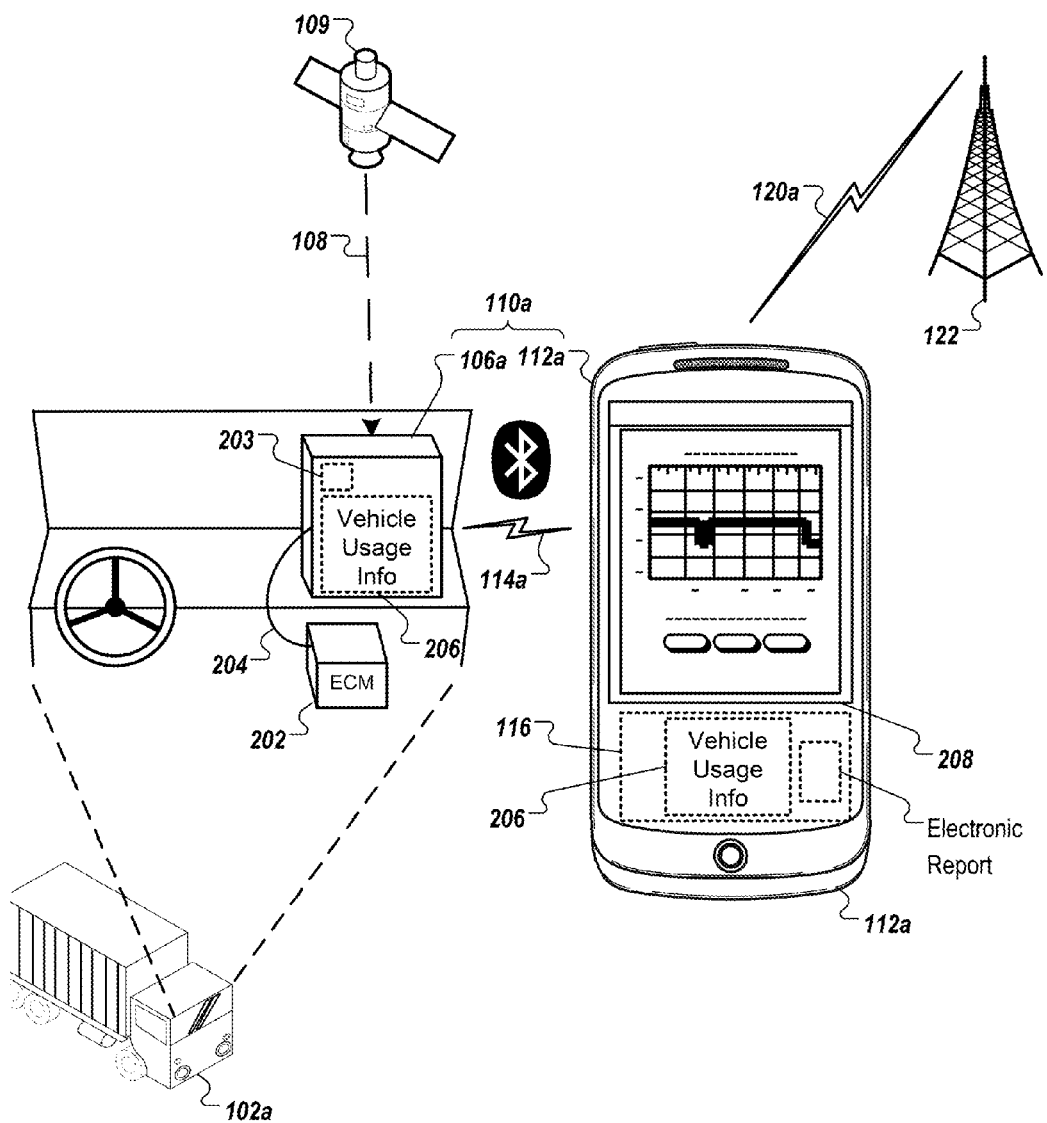
FIG. 2 is a conceptual illustration of driver and vehicle information communications for a single vehicle in the fleet management system of FIG. 1 in further detail.

FIG. 2 is a conceptual illustration of driver and vehicle information communications for a single vehicle in system 110a for communicating fleet vehicle information of FIG. 1 in further detail. Specifically, FIG. 2 illustrates data acquisition device 106a as mounted in vehicle 102a and portable wireless data transfer and display device 112a in further detail. Data acquisition device 106a is mounted in vehicle 102a and is electrically connected to engine control module (ECM) 202 of vehicle 102a vehicle 102a. In particular, data acquisition device 106a may include an input cable, e.g., data bus 204, which electrically connects to a mating connector of ECM 202 within vehicle 102a.

In some implementations, ECM 202 is an electronic device that monitors and/or controls various functions of vehicle 102a. For example, ECM 202 may monitor vehicle speed, engine speed, coolant temperature, vehicle mileage, cargo environmental parameters, and any other appropriate vehicle parameters. In this example, data acquisition device 106a is configured to mount directly to a dash component inside the cabin of vehicle 102a. As previously described, data acquisition device 106a may be a displayless unit that is without any user interface display screen, thereby reducing the size of the unit 106a and facilitating a simplified installation process. User interface 208 of portable wireless data transfer and display device 112a may be used as a portable user interface for data acquisition device 106a when the unit 106a communicates with portable wireless data transfer and display device 112a over Bluetooth connection 114a.

In some examples, data acquisition device 106a may include a single printed circuit board upon which all of its electronic circuitry is mounted, thereby limiting the size and manufacturing complexities of the unit 106a. It should be understood from the description herein, that data acquisition device 106a is depicted as an enlarged size in FIGS. 2-3 for purposes of illustration only, and that the actual size of data acquisition device 106a may be significantly smaller. For example, in some examples, data acquisition device 106a has a maximum length of about 8 inches, a maximum width of about 6.5 inches, and a maximum height of about 1.5 inches. As mentioned previously, the data acquisition device may include a short-range communication module for sending the vehicle data in real-time to a portable wireless data transfer and display device. This occurs when the data acquisition device is mounted in the vehicle and the portable wireless data transfer and display device is within close proximity to the data acquisition device.

As referred to herein, real-time communications represent data pushed over a communication channel that is active once the data is collected. For example, data acquisition device 106a pushes vehicle data gathered to portable wireless data transfer and display device 112a over a preexisting connection. Of course, the actual time period for this "real-time" communication is a time period greater than zero. In some examples, the real-time communication is less than 1 second, and may also be less than 0.1 seconds, less than 50 milliseconds, less than 20 milliseconds, or even less than 20 milliseconds.

In some implementations, data acquisition device 106a may detect the particular type of communications protocol employed by ECM 202, and automatically adapt to the detected protocol in order to communicate with ECM 202. In these circumstances, data acquisition device 106a may be installed in any one of a number of different types of vehicles, e.g., a class 8 large truck, a class 1 car, or the like, and the installer's act of connecting cable 204 to the vehicle's ECM 202 may prompt the control circuitry of data acquisition device 106a to automatically recognize the type of vehicle in which it is installed. As such, some examples of data acquisition device 106a need not be manufactured or preprogrammed in a vehicle-specific manner. For example, in some implementations, ECM 202 may implement a controller area network (CAN), a local interconnect network (LIN), a vehicle area network (VAN), FlexRay, J1939, ISO-11783, domestic digital bus (D2B), IDB-1394, SmartWireX, MOST, J1850, ISO-9141, J1708, J1587, SPI, IIC, or any other communications protocol for communicating with data acquisition device 106a through data bus 204. These communications may be further passed on to portable wireless data transfer and display device 112a which may further communicate as shown in FIG. 1. In such circumstances, data acquisition device 106a may detect the combination and/or signal levels implemented over data bus 204, may analyze incoming data traffic, and/or may query ECM 202 using various protocols and receive corresponding responses in order to determine the protocol in use by ECM 202.

In some implementations, the connector on the end of the data bus cable 204, e.g., the end that connects to ECM 202, may include a connection jack having more data lines than are provided by ECM 202. Multiple converters may be provided to adapt a subset of the port's data lines to a variety of configurations of data bus 204. For example, passenger cars and other "class 1" vehicles may provide a connector that is compliant with the on-board diagnostic (OBD) II specification, while large trucks and other "class 8" vehicles may provide a connector that is compliant with the heavy-duty OBD (HDOBD) specification. In such examples, one converter may be provided to adapt the port to connect to OBDII data buses, and another may be provided to adapt the port to connect to HDOBD data buses. Data acquisition device 106a may sense the configuration of an attached converter to determine the appropriate protocol to use for communication with ECM 202.

In some examples, data acquisition device 106a may be configured to simultaneously communicate via multiple protocols at once of one or more engine control modules. For instance, data acquisition device 106a may be configured to communicate via the J1939 and J1708 protocols at the same time. This feature may be useful, for example, for a vehicle in which ECM 202 communicates in two different protocols, e.g., communicates some information (braking information) on one engine bus and other information, e.g., fuel information, on another engine bus. Also, this feature may be useful when a single vehicle includes multiple ECMs 202 that employed different protocols. Thus, data acquisition device 106a may to gather some vehicle information appears on one engine bus, and to gather other vehicle information on another engine bus. In one implementation, cable 204 may have a first set of wires that are configured to connect with a first ECM (or a first engine bus of an individual ECM) while a second set of wires are configured to mate with a second ECM (or a second engine bus of the individual ECM. Any such vehicle data attained through the ECM could be stored within memory of the data acquisition device.

Furthermore, in particular examples in which ECM 202 or engine bus 204 may not provide a direct odometer reading, data acquisition device 106a may be configured to interpret other engine parameters to create an "effective odometer reading" of vehicle 102a starting at the point when data acquisition device 106a was installed in vehicle 102a. For example, data acquisition device 106a may receive data indicative of vehicle speed, e.g., used in combination with an internal clock or timer of data acquisition device 106a, or data indicative of distance increments, e.g., distance pulses every 0.1 miles, so as to generate an "effective odometer reading" for vehicle 102a. Accordingly, system 110a may be used to comply with distance and odometer reporting requirements (via an electronic report) even if ECM 202 or engine bus 204 of vehicle 102a does not directly provide odometer readings. In addition, system 110a may prompt an installer or other user to manually input the vehicle odometer reading (as shown on the dash of the vehicle) when data acquisition device 106a is initially installed so that the "effective odometer reading" calculated by the system 110 is a substantially accurate estimation of the actual total mileage of vehicle 102a.

As described previously, data acquisition device 106a receives location information, such as global positioning system (GPS) signals 108 from GPS satellites 109 to determine the location of vehicle 102a. For example, data acquisition device 106a may be equipped with a GPS receiver device that receives signals from GPS satellite 109 so that data acquisition device 106a may receive coordinate information, e.g., longitude and latitude coordinates, and time information, e.g., current time. In addition, in some examples, data acquisition device 106a may be equipped with one or more accelerometers 203 to detect particular types of vehicle movement, such as hard brakes, acceleration, and lane changes. Instances of this type of vehicle movement may be recorded by data acquisition device 106a may communicated to control center 104 via portable wireless data transfer and display device 112a for purposes of safety monitoring by a fleet manager or other system user. Thus, during operation of the vehicle, some examples of data acquisition device 106a may receive input information from a combination of ECM 202 of vehicle 102a, the GPS system, and the one or more internal accelerometers 203.

Still referring to FIG. 2, data acquisition device 106a collects information from the various inputs, e.g., ECM 202, the GPS system, and the one or more accelerometers 203, and stores the vehicle information as data in a computer-readable memory module 206. As previously described, in this example, data acquisition device 106a may be displayless and thus has no user interface of its own with which to let a user view or interact with the vehicle information. Rather, in this example, data acquisition device 106a communicates the vehicle information from memory module 206 to portable wireless data transfer and display device 112a over Bluetooth connection 114a, and the vehicle data may be stored in a non-transitory computer-readable memory 116 of portable wireless data transfer and display device 112a. Portable wireless data transfer and display device 112a provides user interface 208 with which the user may access some or all the vehicle information. Examples of user interfaces are discussed in further detail in the descriptions of FIGS. 4A and 4B.

In addition to displaying some or all of the vehicle data on portable wireless data transfer and display device 112a, the vehicle data may also be transmitted two ways with another electronic device or control center 104 for review and archiving or other purposes. For example, in some examples, portable wireless data transfer and display device 112a may communicate with transceiver 122 over cellular link 120a to wirelessly communicate the vehicle data to remote network 130. As such, data acquisition device 106a and portable wireless data transfer and display device 112a operate as a system 110a that is positionable inside vehicle 102a and that communicates information related to the vehicle and its driver. Moreover, at least the display portion, e.g., portable wireless data transfer and display device 112a, of system 110a may be portable relative to data acquisition device 106a and vehicle 102a, thereby permitting the user to view and input vehicle data or driver information even when the user is positioned outside the vehicle. Further, because each portable wireless data transfer and display device 112a-112c is portable relative to vehicles 102a-102c (FIG. 1) and data acquisition device 106a-106c (FIG. 1), each portable wireless data transfer and display device 112a-112c may be configured to wirelessly communicate with any one of the nearby data acquisition device 106a-106c. For example, if the driver carrying portable wireless data transfer and display device 112a switches to vehicle 102b (FIG. 1) for a new workday, the driver's portable wireless data transfer and display device 112a may be configured to wirelessly communicate with data acquisition device 106b (FIG. 1) mounted inside that vehicle 102b for the workday.

Data acquisition device 106a, including the example depicted in FIG. 2 may include a number of additional safety and efficiency features. For one, the device may include a "black box" application for real-time recording of safety events data similar to what is seen in airplanes through flight data recorders. Just as in aviation, the accident data recorder may record vehicle parameters related to safety and may record information related to automobile accidents (for example, sudden changes in speed), material degradation, and automobile performance. The data acquisition device may further include a feature for the computation of International Fuel Tax Agreement (IFTA) data using tax algorithms dependent on the state and nation the vehicle is within. The location of the vehicle may be determined, for example, by using one or more GPA satellites 109. The data acquisition device may also be configured to receive an input of safety settings by a party. For example, a company employing the driver and vehicle may wish to ensure that their drivers do not exceed a particular speed. In some examples, a data acquisition device may track of when a safety violation, such as speeding, hard stop, or otherwise has occurred. Many more nuanced or complicated configuration for safety system integration could be implemented, with the driver, the driver's permanent employer, or the cargo owner all implementing their own safety features into the data acquisition device.

Additionally, data acquisition device 106a may also include additionally be capable of wirelessly receiving and downloading updates from a portable wireless data transfer and display device unit 112a via wireless link 114a. Updates could be related to memory storage, the GPS receiver, the accident data recorder, or any other configurable features of data acquisition device 106a.

Figure 3:
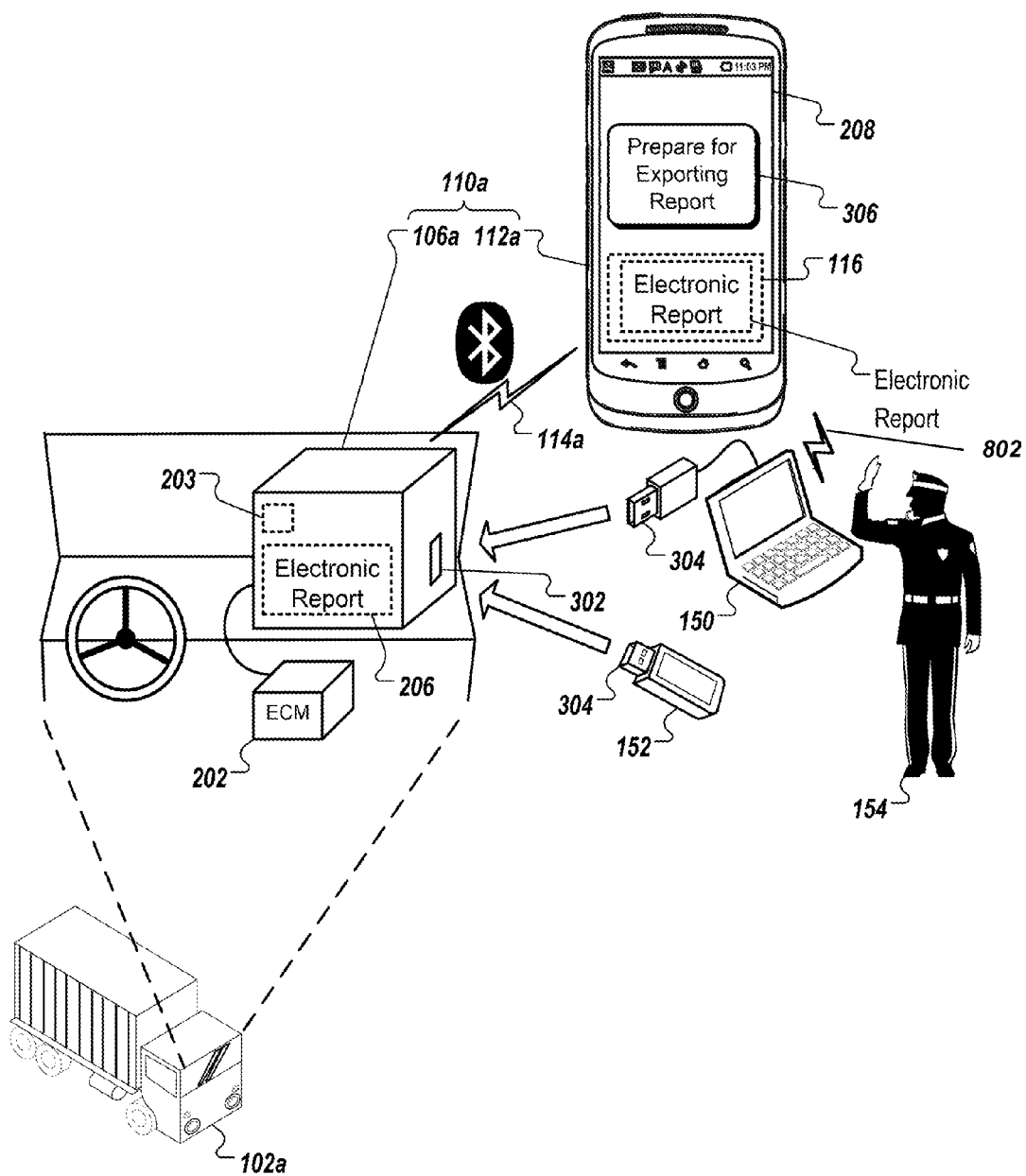
FIG. 3 is a conceptual illustration of the system of FIG. 2 in combination with an external storage device.

Referring now to FIG. 3, each data acquisition device 106a-106c may optionally be equipped with an external data port, e.g., a USB port, for exporting driver summary electronic reports or other data, such as vehicle information or driver data, to a temporarily connected external storage device, such as portable computer device 150, portable storage device 152, or the like. As described previously, data acquisition device 106a includes memory module 206 for storage of the vehicle information and other data, and portable wireless data transfer and display device 112a may receive the vehicle information and generate driver summary electronic reports, such as an electronic duty of file report. In some implementations, the driver summary electronic report stored in the memory 116 of portable wireless data transfer and display device 112a may be copied to data acquisition device 106a, e.g., via wireless link 114a, for subsequent access by a third party such as vehicle inspector 154. Similarly, portable wireless data transfer and display device 112a may be configured to utilize a processor to process vehicle data and driver information into a driver summary electronic report. Portable wireless data transfer and display device 112a may then wirelessly transmit the electronic report to a remote computer via a wireless network. As an example of such data, under some jurisdictions, law enforcement or regulatory inspectors may be authorized to request a copy of the data 206 in order to inspect the driver's record of duty to determine whether the driver is in compliance with laws that regulate the number of consecutive or cumulative hours the driver is permitted to be on duty in a given period. Thus, in some circumstances, the driver summary electronic report may be generated by and stored in portable wireless data transfer and display device 112a, and this driver summary electronic report may be wirelessly communicated to data acquisition device 106a prior to exporting the driver summary electronic report via the output data port 302 of data acquisition device 106a.

As mentioned previously, the portable wireless data transfer and display device may also transmit the driver summary electronic report directly to the remote device 150 via wireless network connection 802. In some examples in which a copy of the driver summary electronic report is stored in both portable wireless data transfer and display device 112a and data acquisition device 106a, and the copies of these files may be updated or sync prior to exporting the driver summary electronic report via the output data port 302 of data acquisition device 106a or via wireless network connection 802 from portable wireless data transfer and display device 112a.

In the illustrated example, the vehicle inspector 154 may request that a copy of the data 206 be copied to the inspector's computer device 150 or the inspector's portable storage device 152. To facilitate communication between data acquisition device 106a and computer device 150 of portable storage device 152, computer device 150 or portable storage device 152 may be plugged into data output port 302 of data acquisition device 106a. As previously described, data output port 302 may be a USB port adapted to accept a USB connector 304 provided by any of computer device 150 and portable storage device 152.

Still referring to FIG. 3, in some examples, portable wireless data transfer and display device 112a may control the transfer of the driver summary electronic report to the inspector's computer device 150 or the inspector's portable storage device 152. For example, the driver summary electronic report or other data stored on data acquisition device 106a may be protected from exporting via data output port 302 until the user provides approval for the data transfer via user interface 208 of portable wireless data transfer and display device 112a. In such circumstances, data stored on data acquisition device 106a may be protected from unauthorized users, and furthermore, data files stored on data acquisition device 106a may be updated or synced with the data files stored on portable wireless data transfer and display device 112a prior to any file exporting operation via data output port 302. In this example, portable wireless data transfer and display device 112a may prompt the user, such as the driver or inspector 154, to initiate the file transfer process wirelessly or via direct connection from data acquisition device 106a to the inspector's computer device 150 or directly to the inspector's portable storage device 152 via user interface 208. User interface 208 of portable wireless data transfer and display device 112a may provide, for example, at least one control button 306 that receives the user input indicative of a command to initiate the file transfer process.

In some implementations, the user control button 306 may be a physical button, a touchscreen button, a selectable menu item, or any other user control mechanism on portable wireless data transfer and display device 112a. In other implementations, the control button 306 may be replaced or implemented with an input to detect a user gesture, a spoken command, e.g., speech recognition, or any other appropriate user action that portable wireless data transfer and display device 112a may detect as a user command. Additionally, portable wireless data transfer and display device 112a may wirelessly transmit the data or electronic report directly to computer device 150 via a short range wireless connection, wireless network connection 802 or using an interface similar to that required for transferring the data from data acquisition device 106a to USB connector 304 or data output port 302.

In response to activation of the user control button 306, system 110a initiates a process in which the driver summary electronic report or other data file is at least partially transferred to data acquisition device 106a for purposes of storing a copy of the file at data acquisition device 106a or otherwise updating an older version of the file stored at data acquisition device 106a. After the current version of the driver summary electronic report or other data file is stored at both portable wireless data transfer and display device 112a and data acquisition device 106a, the driver summary electronic report or other data file may be exported via data output port 302 of the driver summary electronic report or other data file. The operation for transferring the driver summary electronic report or other data file to computer device 150 or to portable storage device 152 may be an automatic process that requires no further user input on portable wireless data transfer and display device 112a and data acquisition device 106a. For example, after the initial user input on the control button 306 of user interface 208, the driver summary electronic report or other data file may be automatically transferred via data output port 302 upon a proper connection with computer device 150 or to portable storage device 152. As such, the driver or the inspector 154 may plug the inspector's device 150 or 152 into the communication port 302 either before or after the driver activates the user control button 306, in which case a copy of the driver summary electronic report from data acquisition device 106a is transferred via data output port 302 to the inspector's device 150 or 152. When finished, the inspector's device 150 or 152, with the driver summary electronic report or other data file stored in the memory thereof, may then be disconnected from the communications port 302 and used by vehicle inspector 154.

Figure 4A:
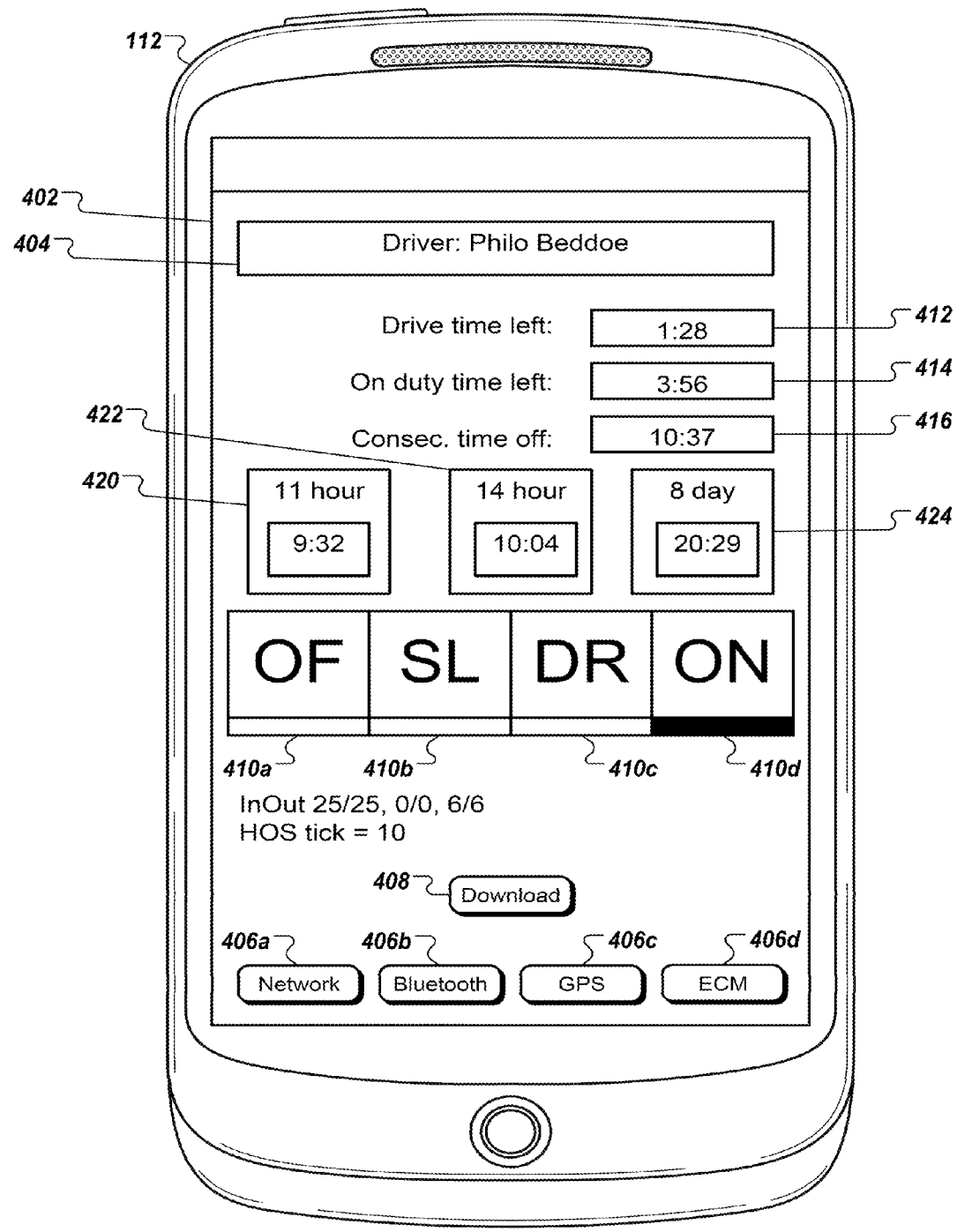
FIGS. 4A-4B illustrate an example user interfaces on a portable wireless data transfer and display device of the fleet management system of FIG. 1.
Figure 4B:
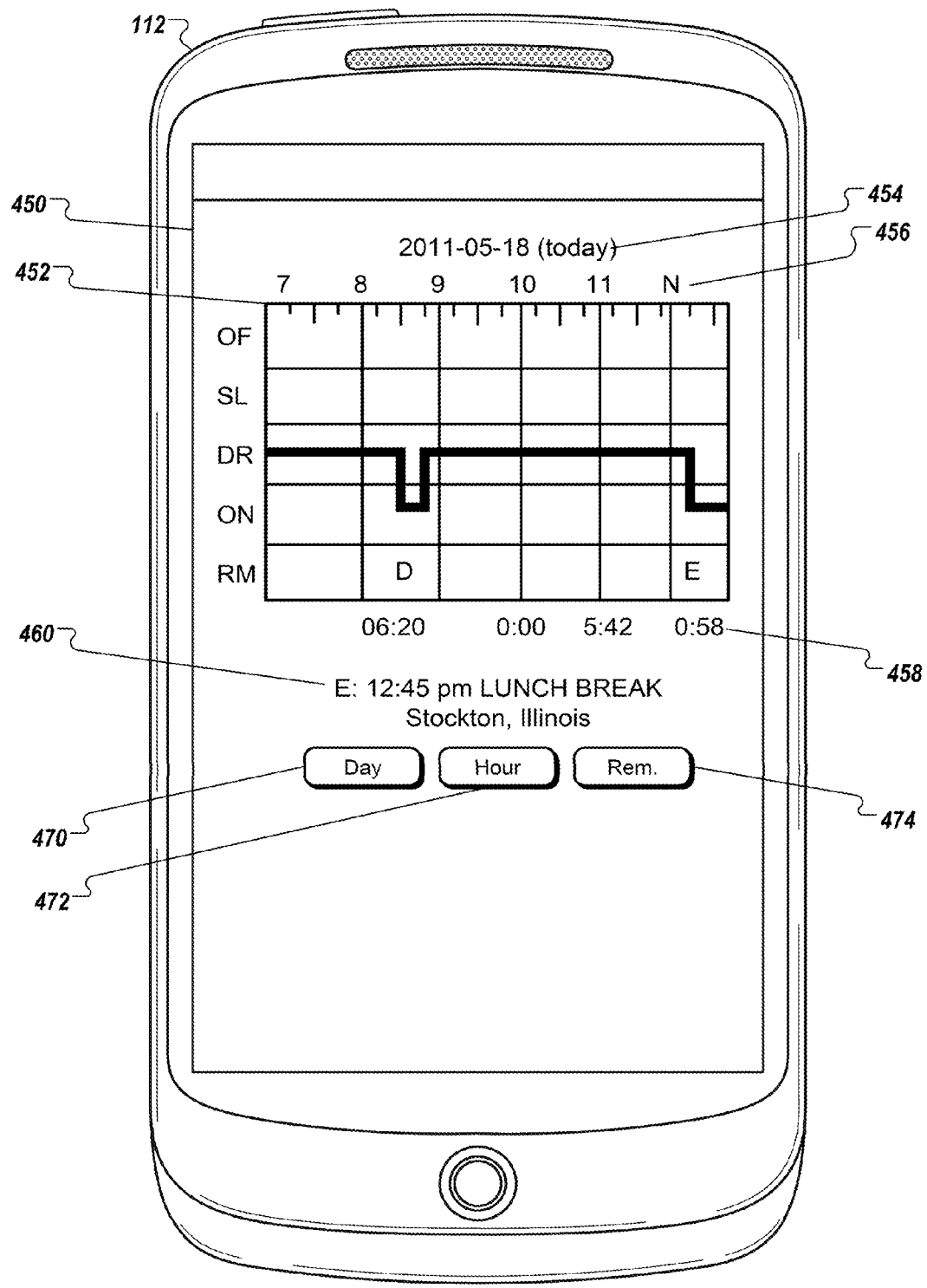

Referring now to FIGS. 4A-4B, portable wireless data transfer and display device 112, which may represent one of portable wireless data transfer and display devices 112a-112c, may provide the user interface for a corresponding one of data acquisition devices 106a-106c as described with respect to FIGS. 1-3. Portable wireless data transfer and display device 112 may also be configured to display information gathered from the devices shown in FIG. 1 such as data acquisition device 106a-106c or control center 104. This includes vehicle data, driver information, processed data, and driver communications. For example, the short-ranged communication module utilized by the portable wireless data transfer and display device may be configured to wirelessly receive data from a data acquisition device when the data is mounted within the vehicle and the portable wireless data transfer and display device is in close proximity to the data acquisition device. Driver information may be input by the user via the user interface.

Furthermore, portable wireless data transfer and display device 112 may function to send data, using a communication module to send vehicle data and driver information to a remote network device at predetermined times. Portable wireless data transfer and display device 112 may also be configured to wirelessly communicate vehicle data, driver information, and electronic reports with at least one remote network device or other portable wireless data transfer and display device at predetermined times via the communication module. Additionally, portable wireless data transfer and display device 112 may use the communication module to: receive processed data from the remote network device using the long-range wireless network, send driver communications using the communication module to one or more other portable wireless data transfer and display devices, send driver communications to one or more remote computers, receive driver communication from another portable wireless data transfer and display device or a remote computer, and to download configuration updates from the remote network device and independently install them using an installation module. Portable wireless data transfer and display device 112 may also be configured to store information, such as the vehicle data, driver information, driver communications, processed data, electronic reports, and remote network device updates via memory.

In different examples, portable wireless data transfer and display device 112 may receive configuration updates representing relatively simple updates; e.g., an update to conform to a change in government regulation. In other examples, portable wireless data transfer and display device 112 may receive more complex updates, such as software updates that provide additional functionality or provide improved service in another manner.

Portable wireless data transfer and display device 112 may also receive configuration updates for data acquisition devices 106. For example, portable wireless data transfer and display device 112a may receive a configuration updates for data acquisition devices 106 and then forward the update to its associated data acquisition device 106a. Such an update may represent a firmware update for the data acquisition devices 106. In different examples, such a firmware update result in the data acquisition device 106 receiving different and/or additional information from the vehicle's ECM. Firmware updates for data acquisition devices 106 may otherwise changing the manner in which the data acquisition device 106 interacts with either the ECM or portable wireless data transfer and display devices or otherwise alter the manner in which data acquisition devices 106 process data.

As shown in FIG. 4A, portable wireless data transfer and display device 112 includes user interface screen 402 configured to present driver duty information for display during operation of the vehicle. In some implementations, portable wireless data transfer and display device 112 may be any one of the portable wireless data transfer and display devices 112a-112c depicted in FIG. 1, and user interface 402 screen may be accessed from a menu selection on user interface 208 (FIG. 2).

In this example, user interface 402 includes driver name display area 404, which displays the name of the driver or other driver information associated with driver. Such driver information may be input into portable wireless data transfer and display device 112 or selected from a list displayed by portable wireless data transfer and display device 112, and the driver information may be used in generating the aforementioned driver summary electronic report.

Still referring to FIG. 4A, a collection of status indicators 406a-406d provides visual indications of several operational parameters of portable wireless data transfer and display device 112 and/or an associated data acquisition device, e.g., data acquisition device 106a-106c. For example, status indicator 406a may display a visual indication of whether portable wireless data transfer and display device 112 is connected to transceiver 122 of FIG. 1 by one of communication links 120a-120c. Status indicator 406b may display a visual indication of whether portable wireless data transfer and display device 112 is connected to its associated data acquisition device 106a-106c by one of Bluetooth connections 114a-114c. Status indicator 406c may display a visual indication of whether portable wireless data transfer and display device 112 is receiving GPS signals 108 from GPS satellites 110. Status indicator 406d may display a visual indication of whether portable wireless data transfer and display device 112 is connected to an associated ECM, such when data acquisition device 106a is connected to the ECM 206 of FIG. 2 by data bus 204.

In some examples, download button 408 is provided by user interface 402 to accept user input indicative of a command to initiate a transfer of data from the associated data acquisition device 106 (FIG. 3) unit to an external storage device, such as computer device 150 or portable storage device 152 as described previously discussed in the description of FIG. 3. Accordingly, the download button 408 may initiate a set of operations in which particular data files stored on portable wireless data transfer and display device 112 are copied to data acquisition device 106 or otherwise used to update with similar files previously stored on data acquisition device 106. From there, one or more data files may be exported via data output port 302 as previously described in connection with FIG. 3. As such, the download button 408 may operate similarly to the previously described control button 306 (FIG. 3).

In addition, user interface 402 provides a number of inputs for the driver to alter his or her driver information, thereby affecting the driver's hours of service and the aforementioned driver summary electronic report. For example, the driver may interact with user control 410a to indicate that he or she is in an "off duty" status. The driver may interact with user control 410b to indicate that he or she is in a "sleeper berth" status, e.g., the driver is resting in a sleeper unit associated with his vehicle. The driver may interact with user control 410c to indicate that he or she is operating his vehicle. The driver may interact with user control 410d to indicate that he or she is in an "on duty" status even when he or she is not driving the vehicle, e.g., inspecting the vehicle or performing other on-duty tasks. In some implementations, user controls 410a-410d may change their visual appearance to indicate the status currently selected by the driver. For example, user control 410a may be displayed with a brighter color than user controls 410b-410d when the driver is in an "off duty" status.

Still referring to FIG. 4A, interface 402 of portable wireless data transfer and display device 112 may also display indicators related to the driver's hours of service. For example, indicator 412 displays the amount of time the driver has left before he or she is in violation of a predetermined drive time limit. Indicator 414 displays the amount of time the driver has left before he or she is in violation of a predetermined on duty time limit. Indicator 416 displays the consecutive amount of time the driver has been off duty.

Additionally, indicator 420 displays the amount of drive time the driver has accrued in a given day, which has an upper limit of "11 hours" of total drive time before he or she is in violation of a predetermined drive time limit. Thus, the time values in indicators 412 and 420 may add up to the maximum drive time limit ("11 hours"). When the driver's total drive time in indicator 420 exceeds the upper limit, the indicator may change colors, for example, to a red color to warn the driver of the violation. Optionally, an indicator 422 displays the amount of on-duty time the driver has accrued in a given day, which has an upper limit of "14 hours" of total on-duty time before he or she is in violation of a predetermined on-duty time limit. Thus, the time values in indicators 422 and 414 may add up to the maximum on-duty time limit, e.g., "14 hours." When the driver's total drive time in indicator 422 exceeds the upper limit, the indicator may change colors, for example, to a red color to warn the driver of the violation. Further, an indicator 424 displays the amount of total on-duty time the driver has accrued in a period of consecutive days, such as "8 days" for example. In this example, the total on-duty time the driver has accrued in an eight-day period may have an upper limit of "70 hours" in this example. When the driver's total drive time in indicator 424 exceeds the upper limit, the indicator may change colors, for example, to a red color to warn the driver of the violation.

As shown in FIG. 4B, portable wireless data transfer and display device 112 may provide another user interface screen 450 that depicts a summary of the driver's duty log. In some examples, the summary information provided in this user interface screen 450 may be employed in the driver summary electronic report that is generated by portable wireless data transfer and display device 112 for purposes of sharing with the aforementioned inspector 154 (FIG. 3). In some implementations, the user interface screen 450 may be accessed from a menu selection on user interface 208 (FIG. 2).

User interface 450 in this example includes an electronic duty log represented by time chart 452. Time chart 452 provides a convenient visualization of the driver's status, e.g., on duty, off duty, driving, sleeper berth, over a selected period of time. Date indicator area 454 displays the date associated with the information presented by time chart 452. A time indicator area 456 displays the times associated with the information presented by time chart 452. A time interval area 458 displays the elapsed time durations associated with the various statuses presented by time chart 452.

A status area 460 displays the driver's current status or the status presented by time chart 452. In some implementations, the status area 460 may include time information, status information, location information, a remark, and (optionally) the driver's name or other identification information. In some implementations, the remark may be selected from a collection of predefined remarks, e.g., "fueling," "breakdown," "loading," "unloading." In some implementations, the remark may be entered by the driver. For example, the driver may need to enter a remark that is not described by a predefined remark, e.g., "helping a motorist."

The driver may interact with a user control 470 to cause time chart 452 to display the duty status over a period of one day or other predetermined time interval of data on time chart 452. The driver may interact with user control 472 to cause time chart 452 to display a one hour or other predetermined time interval of data on time chart 452. The driver may interact with a user control 474 to cause user interface 450 to present additional user controls that the driver may use to enter remark information that may be associated with one or more of the driver's statuses.

In some examples, all or a portion of driver interaction with portable wireless data transfer and display device 112 may be locked out if the vehicle is in motion. For example, one or more features of user interfaces 402, 450 may be unavailable to the driver if portable wireless data transfer and display device 112 determines the vehicle is in motion. In some cases, portable wireless data transfer and display device 112 may interact with the driver only via audible communications such as warning signals or voice communications while the vehicle is in motion. Portable wireless data transfer and display device 112 may determine the vehicle is in motion via vehicle data from the corresponding data acquisition device 106, or by other means, such as a GPS module within portable wireless data transfer and display device 112 or from control center 104 (FIG. 1).

Figure 5:
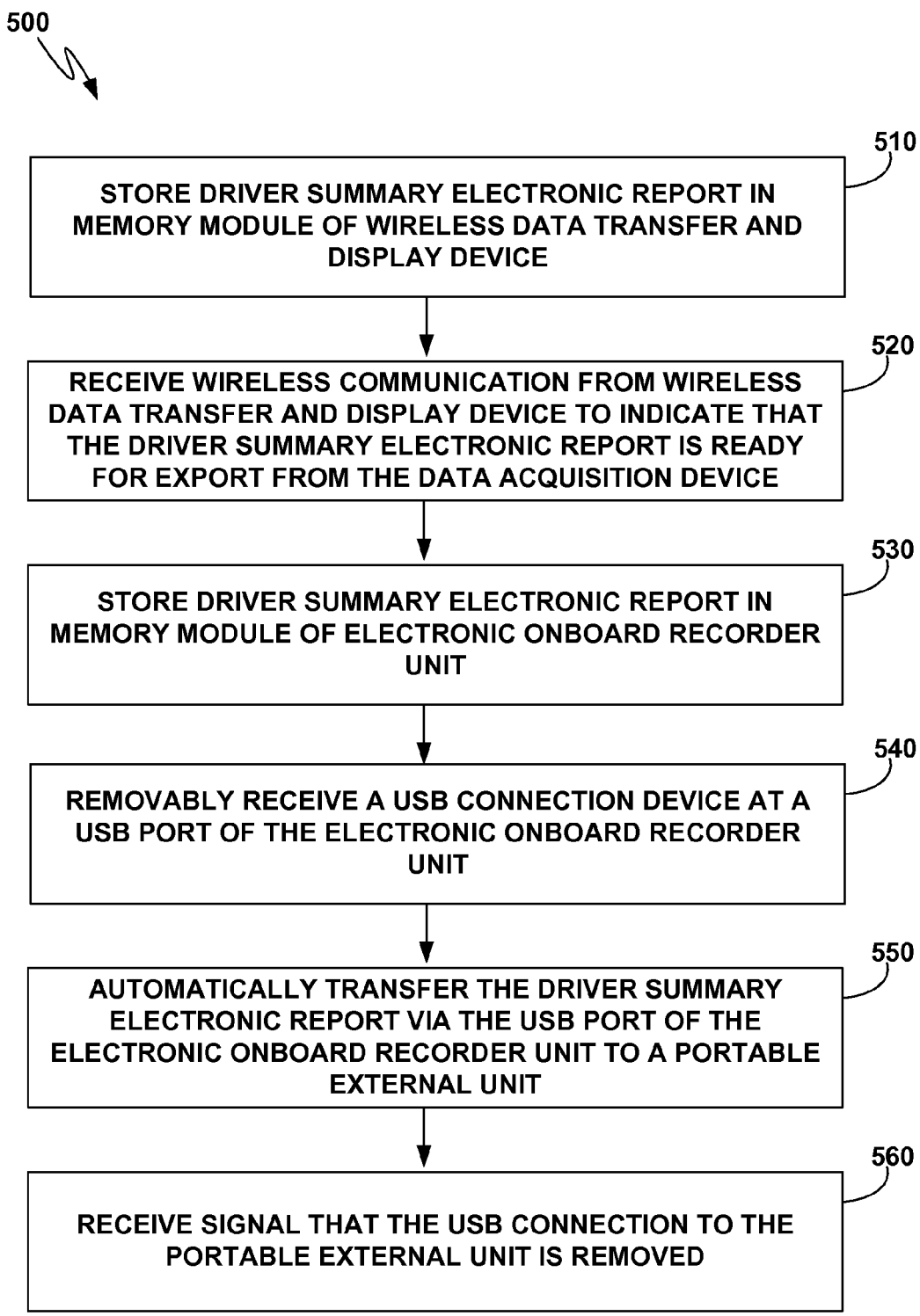
FIG. 5 is a flowchart illustrating techniques for communicating an electronic report or other data from a data acquisition device via an external storage device.

FIG. 5 is a flowchart illustrating a process 500 for communicating an electronic report or other data from a data acquisition device via an external storage device. In one example, the techniques of FIG. 5 may be performed to transfer an electronic report from a data acquisition device, such as unit 106a depicted in FIG. 3, to an external computer or storage device, such as the inspector's device 150 or 152 depicted in FIG. 3. Process 500 may include an operation 510 in which a driver summary electronic report, e.g., a summary of duty report, is held in the memory module of a portable wireless data transfer and display device, e.g., portable wireless data transfer and display device 112a-112c depicted in FIG. 1. For example, data acquisition device 106a may collect the vehicle data over a period of time when a particular driver is using vehicle 102a, and data acquisition device 106a may periodically transfer this vehicle data to the corresponding portable wireless data transfer and display device 112a linked thereto via Bluetooth connection 114a. Portable wireless data transfer and display device 112a may access the vehicle data along with other driver information, e.g., driver identification information and the like, so as to generate the driver summary electronic report for storing on the memory of portable wireless data transfer and display device 112a.

Process 500 may also include an operation 520 in which a wireless communication from the portable wireless data transfer and display device, e.g., portable wireless data transfer and display device 112a, is received to indicate that the electronic report, e.g., the driver summary electronic report, is approved for exporting from the data acquisition device. For example, the driver may activate the user control button 306 as depicted in FIG. 3 so that portable wireless data transfer and display device 112a may prepare data acquisition device 106a for exporting the electronic report, e.g., the driver summary electronic report.

At operation 530 in process 500, the electronic report is also stored in a memory module of a data acquisition device, which is wirelessly linked to the portable wireless data transfer and display device. For example, the electronic report, e.g., the driver summary electronic report, may be wirelessly communicated via the Bluetooth link 114a from portable wireless data transfer and display device 112a to data acquisition device 106a. This operation 530 may be performed in response to operation 520. It should be understood from the description herein that process 500 might be achieved by performing operation 530 either before or after the operation 520. If operation 530 is performed before operation 520, then operation 520 may cause portable wireless data transfer and display device 112a to update the electronic report, e.g., the driver summary electronic report, stored on data acquisition device 106a with a more recent version of the file.

At operation 540, the data acquisition device removably receives a USB connection device at a USB port arranged along the housing of the data acquisition device. For example, as previously described in connection with FIG. 3, data acquisition device 106a may be equipped with a USB port 302 that is configured to removably receive the USB connector 304 from an inspector's portable computer 150 or portable storage device 152. In such circumstances, the vehicle inspector 154 may conveniently plug the external computer device 150 or portable storage device 152 into the USB port 302 provided by data acquisition device 106a to facilitate a transfer of the requested data from data acquisition device 106a.

Process 500 may also include operation 550 in which the electronic report, e.g., the driver summary electronic report, is automatically transferred via the USB port of the data acquisition device to a portable external unit. For example, in response to the user input at operation 520 and the receipt of the USB connection device at operation 540, the driver summary electronic report may automatically transferred via the USB port 302 the inspectors device 150 or device 152 without any further user input at data acquisition device 106a or its corresponding portable wireless data transfer and display device 112a. As such, data acquisition device 106a may be configured to output the driver summary electronic report directly to a temporarily connected external computer device 150, e.g., a notebook computer, or a portable storage device 152, e.g., a USB thumb drive, a portable hard drive, provided by a vehicle inspector 154, e.g., a law enforcement official, a regulatory inspector, or the like.

Process 500 may include operation 560 in which a signal is automatically received by the data acquisition device indicating that the USB connection to the portable external unit is removed. For example, the USB connection device 304 (FIG. 3) may be removed from data acquisition device 106a. When a USB device (sometimes referred to as a slave) is connected to or disconnected from a USB host, e.g., data acquisition device 106a, there is a change on these USB data lines. It is this change that the USB host may use to automatically detect that a device has been connected or removed.

Figure 6:
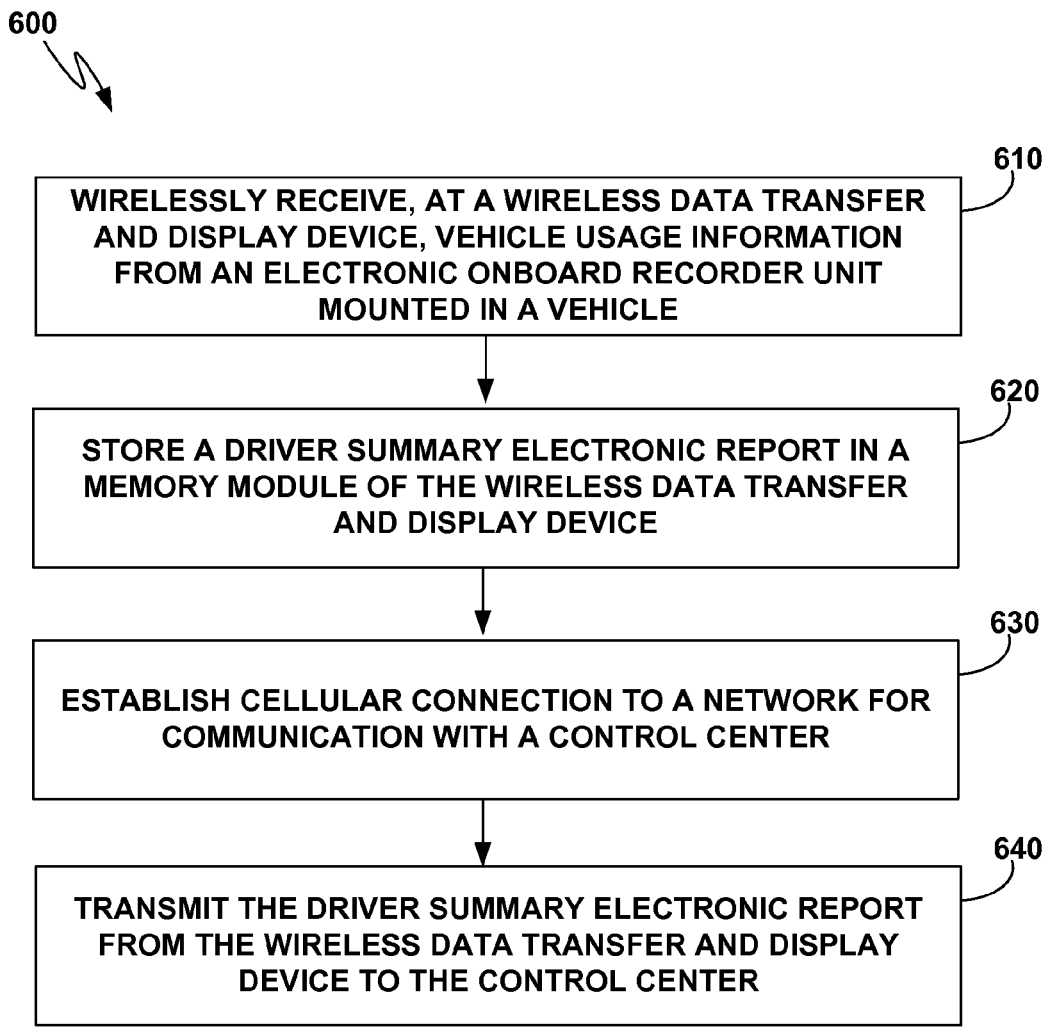
FIG. 6 is flowchart illustrating example techniques for using a portable wireless data transfer and display device to transmit data to a network device.

FIG. 6 is flowchart illustrating process 600 for using a portable wireless data transfer and display device to transmit data to a network device. In some examples, process 600 may be performed to communicate a driver summary electronic report via a cellular link established by a portable wireless data transfer and display device, e.g., portable wireless data transfer and display device 112a depicted in FIG. 3. Process 600 may include an operation 610 in which vehicle data is wirelessly received at the portable wireless data transfer and display device from a data acquisition device mounted in a vehicle. For example, data acquisition device 106a may collect the vehicle data over a period of time when a particular driver is using vehicle 102a, and data acquisition device 106a may transfer this vehicle data to the corresponding portable wireless data transfer and display device 112a linked thereto via Bluetooth connection 114a.

In operation 620, an electronic report, e.g., the driver summary electronic report, is stored in a memory module of a handheld portable wireless data transfer and display device, which is in wireless communication with the data acquisition device, with other portable wireless data transfer and display devices, and with other remote computer systems. For example, portable wireless data transfer and display device 112a may access the vehicle information along with other driver information, e.g., driver identification information and the like, so as to generate the driver summary electronic report for storing on the memory of portable wireless data transfer and display device 112a.

The process may also include operation 630 in which a cellular connection is established to a network for communication between the portable wireless data transfer and display device, in this example, a control center. For example, portable wireless data transfer and display device 112a may establish the wireless connection 120a with transceiver 122, which is in communication with control center 104 through the base station 124 and the network 130.

In operation step 640, the electronic report, e.g., the driver summary electronic report, is transmitted from a portable wireless data transfer and display device to the control center. For example, the electronic report and other data related to the driver or vehicle.

Figure 7:
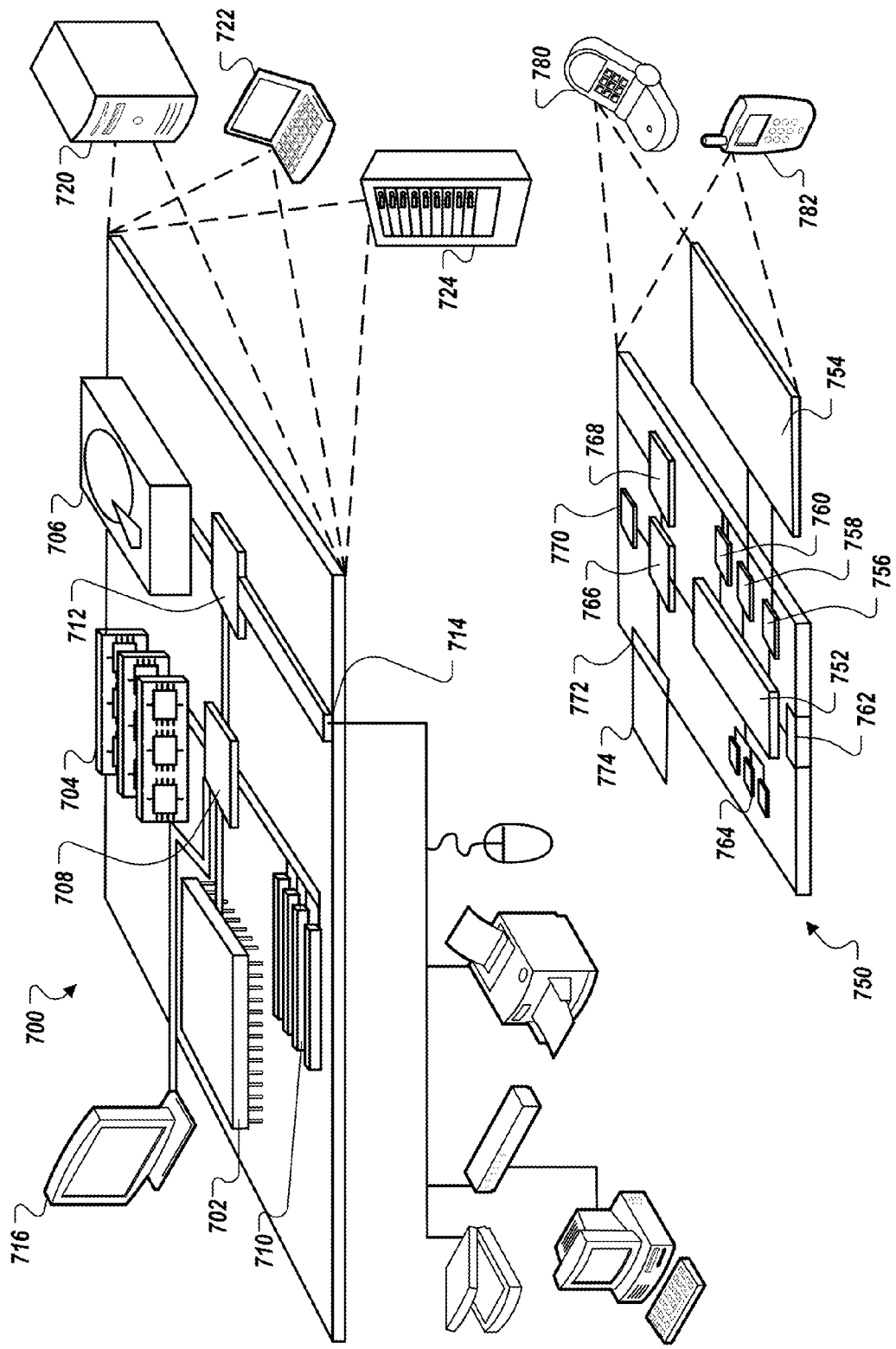
FIG. 7 is illustrates example computing devices suitable for implementing the techniques for managing driver and vehicle information as described herein.

FIG. 7 is a block diagram of computing devices 700, 750 that may be used to implement the systems and methods described in this document, either as a client or as a server or plurality of servers. Computing device 700 is intended to represent various forms of network devices, such as laptops, desktops, workstations, personal digital assistants, servers, blade servers, mainframes, and other appropriate computers. Computing device 750 is intended to represent various forms of portable wireless data transfer and display device, such as personal digital assistants, cellular telephones, smartphones, tablets, laptops and other similar computing devices. The components shown here, their connections and relationships, and their functions, are merely exemplary only, and changes may be made to these examples within the spirit of this disclosure.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 may process instructions for execution within the computing device 700, including instructions stored in memory 704 or on storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations, e.g., as a server bank, a group of blade servers, or a multi-processor system.

Memory 704 stores information within the computing device 700. In one implementation, memory 704 is a computer-readable medium. In an implementation, memory 704 is a volatile memory unit or units. In another implementation, memory 704 is a non-volatile memory unit or units.

Storage device 706 is capable of providing mass storage for the computing device 700. In one implementation, storage device 706 is a computer-readable medium. In various different implementations, storage device 706 may be a floppy disk device, a hard disk device, an optical disk device, or a tape device, a flash memory or other similar solid state memory device, or an array of devices, including devices in a storage area network or other configurations. The computer program product contains instructions that, when executed, perform one or more methods, such as those described above. The information carrier is a computer- or machine-readable medium, such as memory 704, storage device 706, or memory on processor 702.

High-speed controller 708 manages bandwidth-intensive operations for the computing device 700, while low-speed controller 712 manages lower bandwidth-intensive operations. Such allocation of duties is exemplary and could be changed in other examples. In one implementation, high-speed controller 708 is coupled to memory 704, display 716, e.g., through a graphics processor or accelerator, and to high-speed expansion ports 710, which may accept various expansion cards (not shown). In the implementation, low-speed controller 712 is coupled to storage device 706 and low-speed expansion port 714. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a portable wireless data transfer and display device (not shown), such as device 750. Each of such devices may contain one or more of computing device 700, 750, and an entire system may be made up of multiple computing devices 700, 750 communicating with each other.

A network device exemplified in FIG. 7 may also be configured to receive vehicle data, driver information, and driver communications, at pre-determined times, from at least one portable wireless data transfer and display device. This includes those portable wireless data transfer and display devices 750, which may transmit the data through a long-range wireless network. The network device may then store the vehicle data, the driver information, and the driver communications in memory 706. The network device may be configured to process any of the vehicle data, the driver information, and the driver communications within the memory 706 into summary electronic reports via the processor 702. The network device may then use the network communication module to send the vehicle data, the driver information, the driver communication, and the summary electronic reports at least one portable wireless data transfer and display device via the long-range wireless network. In part to assist the user, the network device may also present the vehicle data, driver information, driver communication, electronic report to the user using the display 716.

Furthermore, the network device may also upload any of the vehicle data, the driver information, the driver communications, or the summary electronic reports to a website (not shown) using a website communication module. This website may be used to conveniently present information to the any interested parties, such as the drivers, the cargo owners, the companies the drivers are working for, or for the network device operators themselves. The user may also find it helpful to use a configuration of the network device that presents vehicle data, driver information, driver communications, and electronic reports on the display 716. Such a display may allow programmable categories and subgroups including of particular drivers, vehicles, and companies to allow for customization of the display 716 presented to the user.

The network device may also be used to update the configurations of various portable wireless data transfer and display devices units such as 750, 780, and 782. This may also be done using the network communication module. Examples of updates include communication or interface updates of the portable wireless data transfer and display device. In different examples, configuration updates may represent relatively simple updates; e.g., an update to conform to a change in government regulation. In other examples, configuration updates may be more complex, such as software updates that provide additional functionality or provide improved service in another manner. In further examples, configuration updates may represent firmware updates for data acquisition devices. In different examples, such a firmware update result in a data acquisition device receiving different and/or additional information from a vehicle's ECM. Firmware updates for data acquisition devices may otherwise changing the manner in which a data acquisition device interacts with either the ECM or portable wireless data transfer and display devices or otherwise alter the manner in which data acquisition devices process data.

The various networks used by the network device, including the long-range wireless networks, may be configured to utilize the Internet for convenience or otherwise. The network device may further send stored vehicle data, driver information, driver communications, and driver electronic reports to other remote computers using a management communication module (not shown in FIG. 7). This may be done because among other reasons for reasons including allowing third parties to view the information.

For instances where the network device is desired to serve as a database for information it may be further configured to expand upon the above storing and sharing of information. The network device may utilize the communication module to receive vehicle data and driver information, at predetermined times, such as at real-time or at intervals that approximate real-time, from a plurality of portable wireless data transfer and display devices via a long-range wireless network. The network device may then store the vehicle data and driver information in memory 706. To give the network device access to data throughout periods of time, it may then successively store any updates of the vehicle data and the driver information in memory 706 for each of the plurality of portable wireless data transfer and display devices, such as device 782, 780 and 750. This data may be stored, at predetermined times, such as at real-time or at intervals that approximate real-time, when the communication module receives the vehicle data and the driver information from the plurality of portable wireless data transfer and display devices providing the information. The network device may than receive data requests for vehicle data and driver information from one of more remote computer devices, such as from the owners of cargo, driving companies, etc. This data may be received by using a communication module and further sent using the communication module through any network used by the network device and the remote computer devices (not shown). In the same fashion as with the vehicle data and driver information above, the network device may be configured to receive driver communications from the plurality of portable wireless data transfer and display devices, store in memory, and send the driver communications to remote computer devices. Similarly, the network device may be configured to receive driver electronic reports from a computer device using the communication module and communicating using a network. The network device may then store the summary electronic reports in the memory 706 and successively store of updates of the summary electronic reports in the memory 706. These driver electronic reports may then be sent using the communication module, with the driver electronic reports corresponding to the data request sent from the remote computer device through the network.

The computing device 750 is an example of a portable wireless data transfer and display device. The computing device 750 may include a processor 752, memory 764, an input/output device such as a display 754, a communication interface 766, and a transceiver 768, among other components. The portable wireless data transfer and display device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 may process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication, e.g., via a docking procedure, or for wireless communication, e.g., via Bluetooth or other such technologies.

The memory 764 stores information within the portable wireless data transfer and display devices 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 maybe provide as a security module for device 750, and may be programmed with instructions that permit secure use of device 750.

The memory 764 may include for example, flash memory and/or MRAM memory, or other tangible mediums. The computer program product contains instructions that, when executed, perform one or more methods, such as those described above. In one or more examples, the functions described may be implemented in hardware, software, firmware, or any combination thereof. If implemented in software, the functions may be stored on or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, various units may be combined in a hardware unit or provided by a collection of interoperative hardware units, including one or more processors as described above, in conjunction with suitable software and/or firmware.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Portable wireless data transfer and display device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound, e.g., voice messages, music files, etc., and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback, and input from the user may be received in any form, including acoustic, speech, or tactile input.

The systems and techniques described here may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the systems and techniques described here, or any combination of such back end, middleware, or front end components. The components of the system may be interconnected by any form or medium of digital data communication, e.g., a communication network. Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Figure 8:
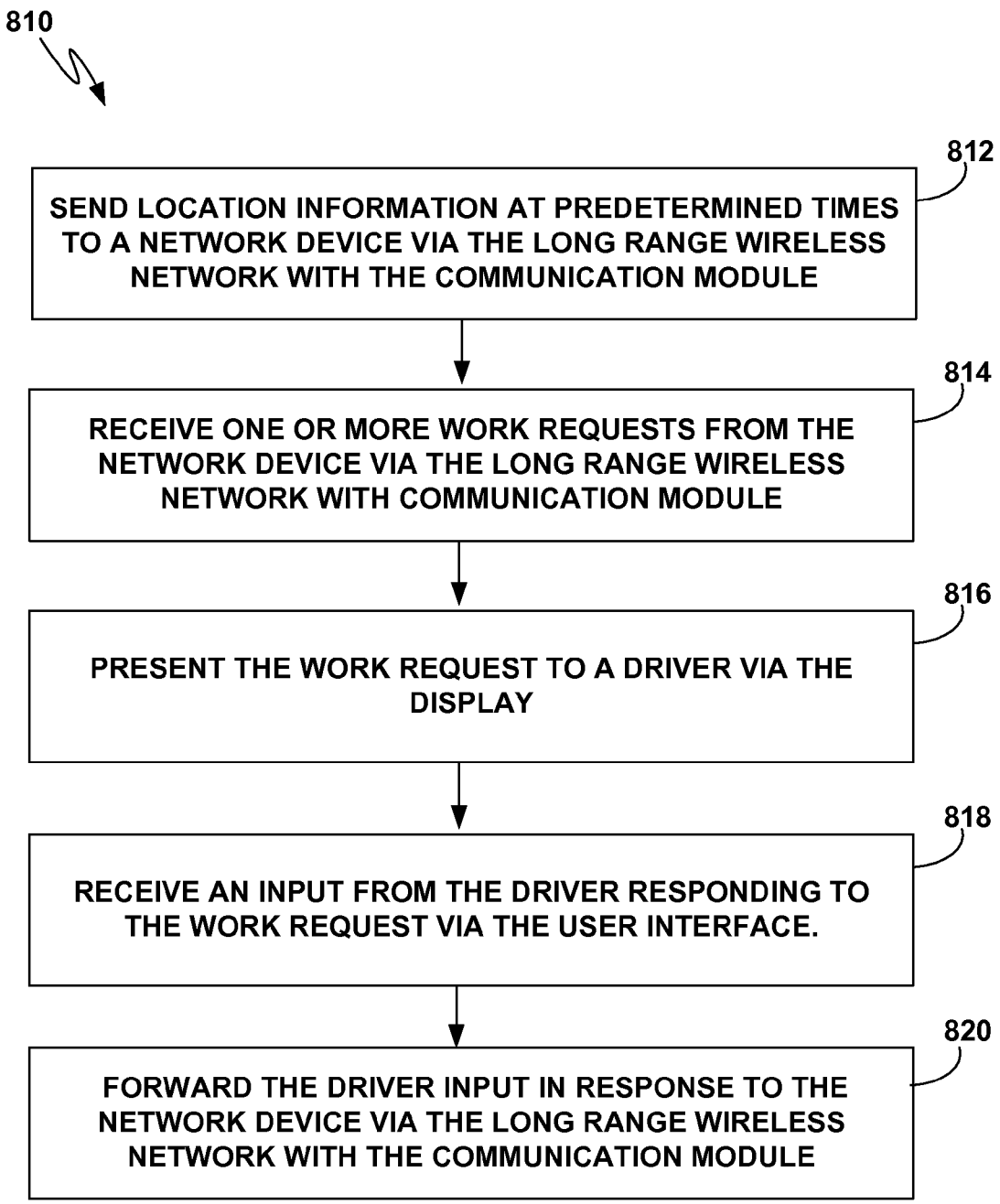
FIG. 8 is a flowchart illustrating example techniques for using a portable wireless data transfer and display device for communicating on work requests.

FIG. 8 illustrates process 810 for a potential example of the portable wireless data transfer and display device, such as device 112*a* from FIG. 1. In this example, such a device may utilize a communication module that is configured to send location information to a network device, such as a network device of control center 104, through a long-range wireless network, such as wireless network including wireless connection 120*a* (812). The portable wireless data transfer and display device may also receive one or more work requests from the network device through the long-range wireless network (814). The communication module may send or receive these communications at predetermined times. The portable wireless data transfer and display device may then present the work request on its display (816). In response, a driver may enter an input on the user interface and the portable wireless data transfer and display device may accept the input from a driver responding to the work request on the user interface (818).

The portable wireless data transfer and display device may also be configured to automatically forward the driver's response to the network device using the long-range wireless network (820). In this manner, driver may respond to a network device, for example, in order to inform the operator that he/she is able or unable to abide by the work request. In particular instances, the communication module may be further configured to receive a modified route corresponding to the work request from the network device through the long-range wireless network. Therefore, upon acceptance of the work request by the driver on the input, the portable wireless data transfer and display device may present the modified route through the display. This way a driver may accept a work request, and automatically have the schedule in his/her portable wireless data transfer and display device update to accommodate the new schedule.

Figure 9:
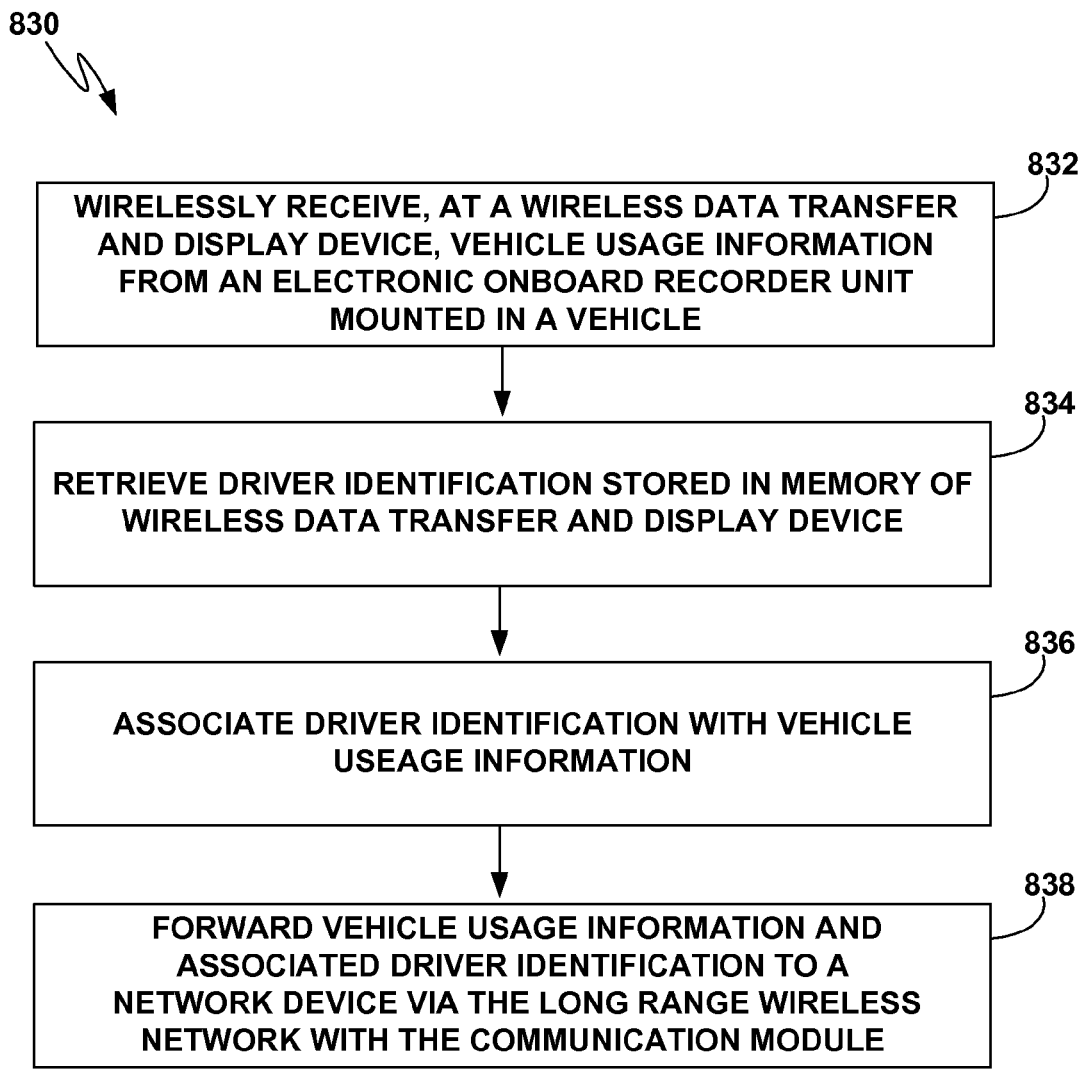
FIG. 9 is a flowchart illustrating example techniques for associating vehicle usage information with a driver using a portable wireless data transfer and display device.

FIG. 9 illustrates a process 830 for associating vehicle usage information with a driver using a portable wireless data transfer and display device, such as device 112a from FIG. 1. First vehicle data is wirelessly received at the portable wireless data transfer and display device from a data acquisition device mounted in a vehicle (832). For example, data acquisition device 106a may collect the vehicle data over a period of time when a particular driver is using vehicle 102a, and data acquisition device 106a may transfer this vehicle data to the corresponding portable wireless data transfer and display device 112a linked thereto via Bluetooth connection 114a.

Portable wireless data transfer and display device 112a retrieves a driver identification, which may optionally be stored in memory of portable wireless data transfer and display device 112a (834). In other examples, the driver may be identified by portable wireless data transfer and display device 112a in another manner, including but not limited to driver input, e.g., password, and/or an electronic tag, such as an RF readable tag associated with the driver.

In any event, portable wireless data transfer and display device 112a associates the driver identification with the vehicle data (836). For example, portable wireless data transfer and display device 112a may access the vehicle information along with other driver information, e.g., driver identification information and the like, so as to generate the driver summary electronic report for storing on the memory of portable wireless data transfer and display device 112a.

Association of the driver identification with the vehicle data by portable wireless data transfer and display device 112a prior to sending the vehicle data to control center 104 allows control center 104 to populate its database without needing to first associate the vehicle data with a driver. Further, because the presence of portable wireless data transfer and display device 112a or a driver input is used to identify the driver, the association between the driver and the vehicle data may be more accurate than with a system in which control center 104 relies on driver assignments or other records to associate vehicle data with a driver.

Then in real-time, at a predetermined time, periodically or otherwise, portable wireless data transfer and display device 112a forwards the vehicle data along with the associated driver identification to a remote network device, such as a device of control center 104 (838). The vehicle data along with the associated driver identification may optionally be packaged as a driver summary electronic report. The process may include establishing a cellular connection to a network for communication between the portable wireless data transfer and display device and the remote network device. For example, portable wireless data transfer and display device 112a may establish the wireless connection 120a with transceiver 122, which is in communication with control center 104 through the base station 124 and the network 130.

Figure 10:
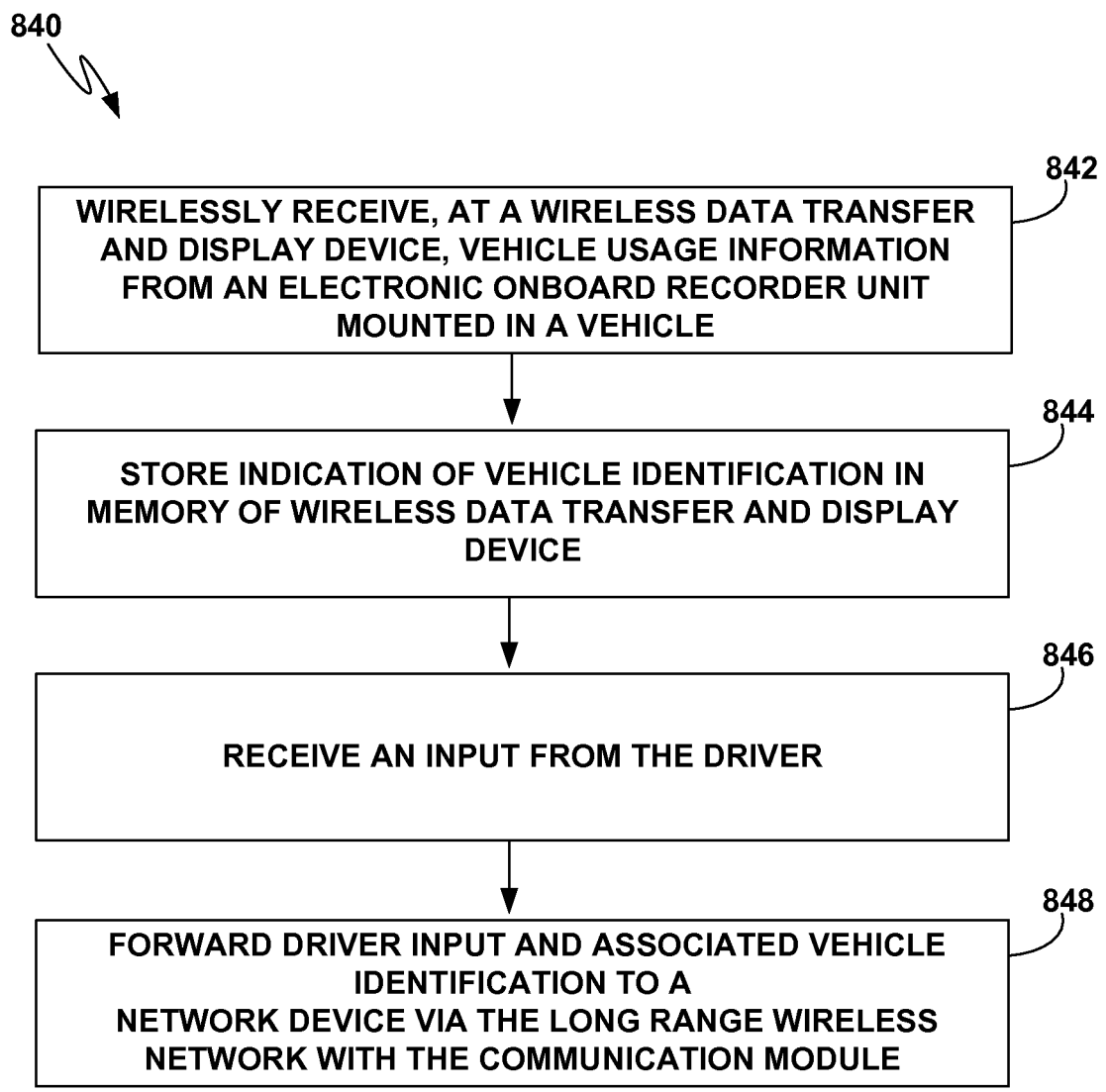
FIG. 10 is a flowchart illustrating example techniques for associating inputs of driver information with vehicle data using a portable wireless data transfer and display device.

FIG. 10 illustrates a process 840 for associating inputs of driver information with vehicle data using a portable wireless data transfer and display device, such as device 112a from FIG. 1. First, vehicle data is wirelessly received at the portable wireless data transfer and display device from a data acquisition device mounted in a vehicle (842). For example, data acquisition device 106a may collect the vehicle data over a period of time when a particular driver is using vehicle 102a, and data acquisition device 106a may transfer this vehicle data to the corresponding portable wireless data transfer and display device 112a linked thereto via Bluetooth connection 114a.

Portable wireless data transfer and display device 112a receives an indication of the vehicle identification as part of the vehicle data. The indication of the vehicle identification may optionally be stored in memory of portable wireless data transfer and display device 112a (844). In some examples, the indication of the vehicle identification may represent a unique identifier of ECM 202 and/or a unique identifier of data acquisition device 106a (FIG. 2).

Portable wireless data transfer and display device 112a may then receive an input from the driver and associates the driver input with the vehicle identification (846). For example, portable wireless data transfer and display device 112a may access the vehicle information along with other driver information, e.g., driver identification information and the like, so as to generate the driver summary electronic report for storing on the memory of portable wireless data transfer and display device 112a.

Association of the driver input with the vehicle identification by portable wireless data transfer and display device 112a prior to sending the driver input to control center 104 allows control center 104 to populate its database without needing to first associate the driver input with a vehicle. Further, because a unique identifier of the vehicle is used by portable wireless data transfer and display device 112a, the association between the driver input and the vehicle may be more accurate than with a system in which control center 104 relies on driver assignments or other records to associate driver inputs and the vehicle.

Then in real-time, at a predetermined time, periodically or otherwise, portable wireless data transfer and display device 112a forwards the driver input along with the associated vehicle identification to a remote network device, such as a device of control center 104 (848). The driver input along with the associated vehicle identification may optionally be packaged as a driver summary electronic report. The process may include establishing a cellular connection to a network for communication between the portable wireless data transfer and display device and the remote network device. For example, portable wireless data transfer and display device 112a may establish the wireless connection 120a with transceiver 122, which is in communication with control center 104 through the base station 124 and the network 130.

Figure 11:
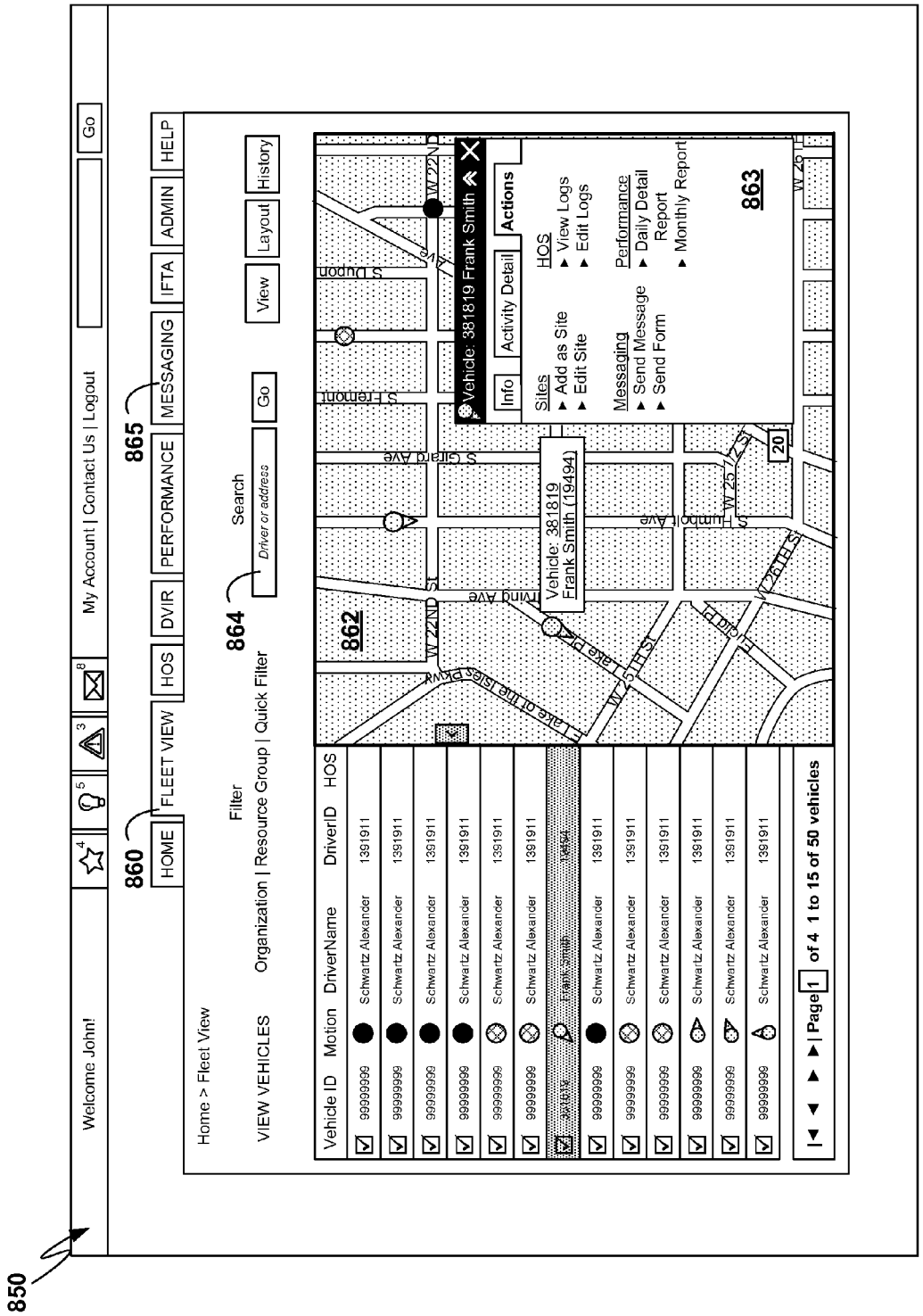
FIG. 11 illustrates a user interface of a network device presenting vehicle data, driver information, driver communication, and summary electronic report of the plurality of vehicles in a real-time by location display.
Figure 12:
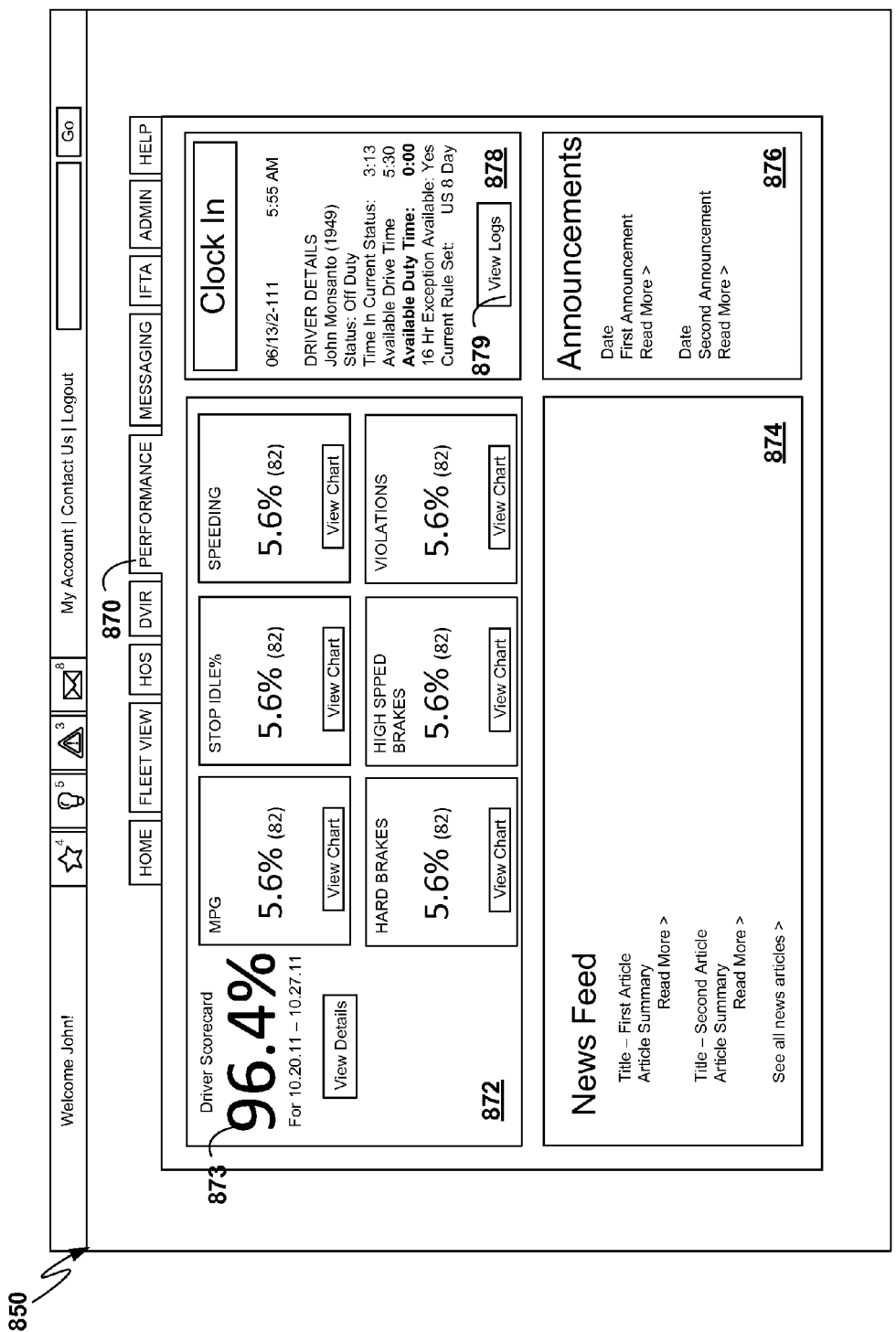
FIG. 12 illustrates a user interface of a network device presenting an electronic driver scorecard according to specified safety and efficiency criteria.
Figure 13:
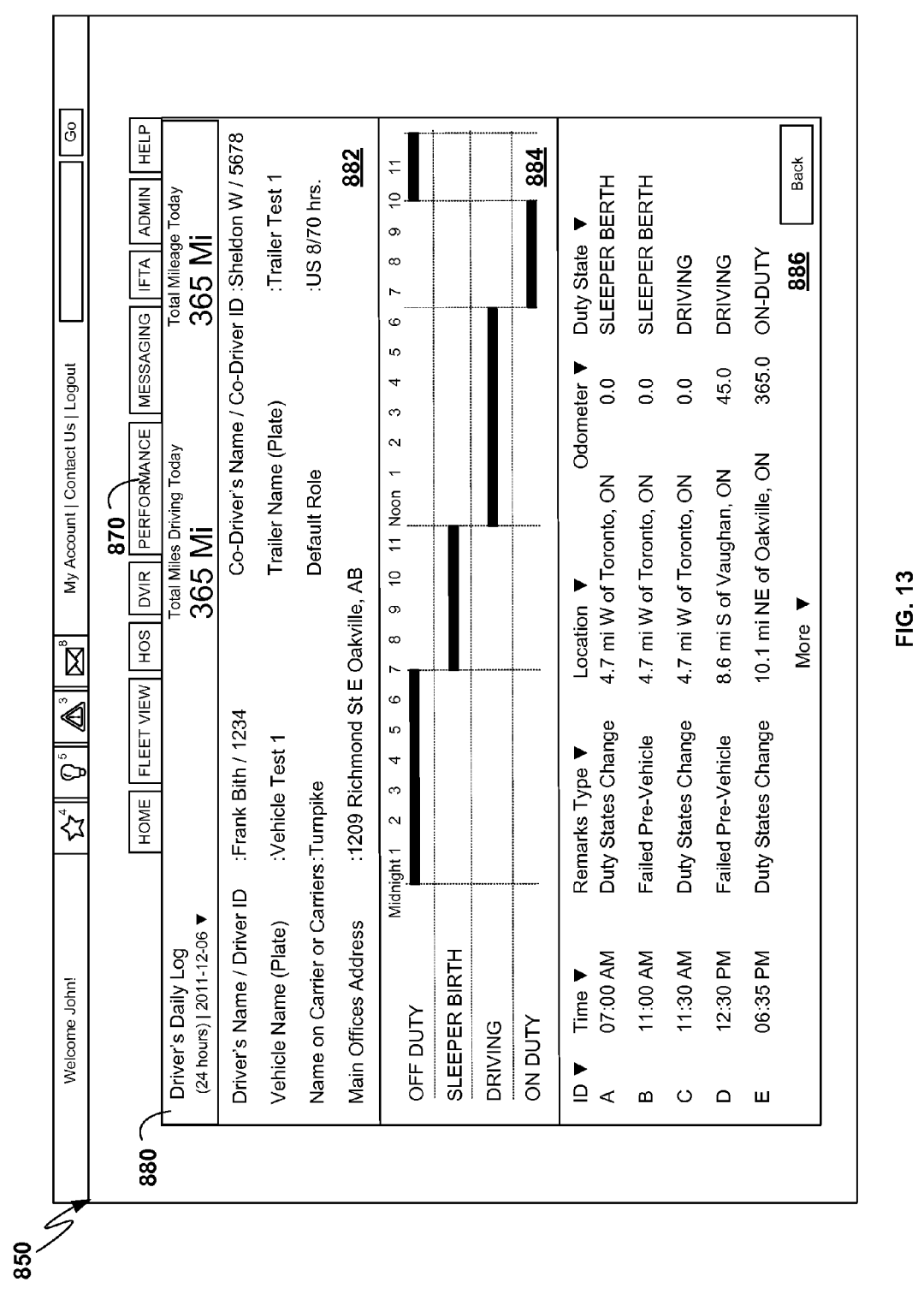

FIGS. 11-13 illustrates user interface 850 of a network device, such as computing device 700 (FIG. 7). User interface 850 is shown in various states within FIGS. 11-13. A user of a network device may also be configured to manage customers or subscribers by way of user interface 850. In one example, a network communication module is configured to receive vehicle data and driver information. This data may be received at predetermined times, such as at real-time or at intervals that approximate real-time, from a plurality of portable wireless data transfer and display devices connected to the network device by one or more long-range wireless network. The network communication module may be further configured to receive subscriber information from one or more remote computing devices in a network. This subscriber information associates one or more subscribers with the vehicle data and the driver information from a plurality of the portable wireless data transfer and display devices. The remote computers may be, for example, corporate computers used by individuals managing a fleet. The network communication module may then be configured to receive a request for vehicle data and driver information from a remote subscriber device (example, a company computer). The network device sends the vehicle data and driver information associated with a subscriber according to the subscriber information received earlier by the remote computer. In this manner, for example, a company may monitor their operations.

The network device may include a processor configured to process the subscriber information, one or more of the vehicle data, and one or more of the driver data into a subscription report. This subscription report may compare the subscriber's vehicles data and driver's information with the number of on-board-computer (OCB) subscriptions, driver subscriptions, or dual driver and OCB subscriptions.

The communication module may also be configured to receive a request for the subscription report from a remote subscriber device. The device may then provide the remote subscriber device with the processed subscription report associated with the subscriber according the subscriber information. Furthermore, the network communication module may be configured to receive vehicle data and driver information, at predetermined times, such as at real-time or at intervals that approximate real-time, from a plurality of portable wireless data transfer and display devices via a long-range wireless network. In this way, an up-to-date subscription report may be created as the subscriber's vehicle data and driver information may be updating frequently.

A network device may also be configured to allow for messaging. In some such examples, the network communication module is configured to receive vehicle data, driver information, and driver communications from a plurality of portable wireless data transfer and display devices. These communications may be received at predetermined times through a long-range wireless network. The network communication module can also be configured to receive a network communication from one or more of the portable wireless data transfer and display devices through the long-range wireless network. The network device may be configured to store the vehicle data, driver information, driver communication, and the network communication in memory. In part to give the user a display of the information, the network device may be configured to present the vehicle data, driver information, driver communication, and the network communications from the plurality of portable wireless data transfer and display devices to the user through a display. The network device can also be configured to accept user inputs of network communications using the user interface, possibility in response to network communication received from the plurality of portable wireless data transfer and display devices. The device then may send network communications using the network communication module to the plurality of portable wireless data transfer and display devices through the long-range wireless network. These network communications may include route, information, forms (business or governmental, for example, destination pictures, landmark pictures, signatures, and safety warnings.

FIG. 11 illustrates a user interface 850 of a network device, such as computing device 700 (FIG. 7), presenting vehicle data, driver information, driver communication, and summary electronic report of the plurality of vehicles in a real-time by location display. As shown in FIG. 11, a plurality of vehicles are indicated on street-view map 862 of fleet view tab 860. Although map 862 is depicted as a street view map, in other examples, an aerial view map, a conceptual view, or another type of map view, may be used instead of or in addition to a street view map. Fleet view tab 860 further lists vehicle IDs and corresponding driver IDs in a location adjacent to map 862.

Fleet view tab 860 allows for selection of the vehicle. Selection of a vehicle on map 862 induced pop-up window 863. A user to may send a work requests to wireless devices corresponding the vehicles shown in by either selecting one of the vehicles directly on map 862 or by accessing messaging tab 865. A user may also retrieve route information for the vehicles shown by selection of the vehicle and clicking the appropriate link on pop-up window 863.

Search box 864 allows a user to search for a vehicle, driver or address, which may or may not be depicted on map 862. After a user enters a search term, map 862 may reposition to a new location in order to display the results of the search. In this way, a user can utilize search box 864 in one or more of a plurality of types of searches (e.g., vehicle, driver and/or address), all of which are pertinent to fleet management. In some cases, departure address, current address and destination address may all be searchable parameters of the system.

In the example shown in FIG. 11, user interface 850 allows for comparison and management of an interested party, for example, a company owning a fleet of vehicles. Such a network device may utilize a network communication module configured to receive vehicle data, driver information, and driver communications, at pre-determined times, from a plurality of portable wireless data transfer and display device within a long-range wireless network. The network device may also be configured to store in memory the vehicle data, driver information, and driver communications. The network device may use a processor to process any of the vehicle data, the driver information, or the driver communication into summary electronic reports. The vehicle data, the driver information, the driver communication, and the summary electronic report may then be presented by the display to the user.

One or more of the vehicle locations may also be tracked for a period of time, which may be input by a user into the interface, so that the vehicle(s) past, present, or future locations may be viewed on the display. In this manner, routes may be viewed and assessed, among other functions. The user interface may also be configured to allow for selection of the drivers presented, in order to send work requests to wireless devices in use by the selection of the drivers presented. Such work requests may include shipments that need to be made or altered, and the user of the network device may use the display and interface to assess which drivers might be able to assist with delivery. The user may then contact the driver(s) on their portable wireless data transfer and display device unit(s) to see if they can accept some or the entire work request using the network communication module. The network device may also use the network communication module configured to send any of the vehicle data, the driver information, the driver communication, and the summary electronic report one or more portable wireless data transfer and display devices in the long-range wireless network.

FIG. 12 illustrates a user interface 850 of a network device, such as computing device 700 (FIG. 7), presenting electronic driver scorecard 872 within of performance tab 870. In other examples, user interface 850 may be presented on a portable wireless data transfer and display device, such as computing device 750 (FIG. 7).

A network device may be configured to produce user interface 850 as shown on the example of FIG. 12 for the purposes of providing an electronic driver scorecard. This scorecard may be used, for example, by companies and individuals to analyze or compare safety and efficiency information of drivers and vehicles. In particular examples, the network device may be configured to receive vehicle data, driver information, and driver communications through long-range communication network at predetermined times. These could be delivered to the network device from portable wireless display and transfer units, from remote computers, or from some other source. The vehicle data, driver information, and the driver communications may then be stored in memory. The device may utilize a processor to process vehicle data, driver information, and driver communications into an electronic driver scorecard according to various safety and efficiency criteria. The electronic scorecard may include one or more alphanumerical ratings according to a user's selection of driver(s). In the example shown on page 26, a single driver has been selected by the driver. The driver's overall fuel usage, number of stop idles and other criteria are given numerical ratings. Similarly, the driver as a whole is given a total rating for a selected period of time.

Electronic driver scorecard 872 displayed in FIG. 12 is produced by the network device by processing vehicle data, driver information, and driver communications. Electronic driver scorecard 872 includes an overall numeric rating 873, which represent a composite rating of multiple factors. In other examples, an alphanumerical rating may be used. In different examples, the specified safety and efficiency criteria may include any number of factors selected from a group consisting of: a fuel analysis; a speed analysis; a speeding analysis; an accident analysis; a violations analysis, a hard brake analysis, a high-speed brake analysis, an idle analysis, a regulatory compliance analysis, an hours of driving analysis, a vehicle maintenance analysis, a cargo maintenance analysis, a corporate rule compliance analysis, a delivery history analysis, and a delivery time analysis. Any variety of these factors could define a set or sub-set of factors used and displayed by the system.

In some examples, the factors may be selectable by the user so as to allow the driver scorecard to be adaptive and modifiable by different users. In such examples, the alphanumeric score may be based on a sub-set of selected factors that are selected by the user. Moreover, in still other examples, weights may be assignable to each selected factor. If weights are used, each factor may affect the overall alphanumeric score of the driver, based at least in part on the weight assigned to the given factor. For example, the entire sub-set of selected factors may have a combined weighting equal to 1.0, and each factor may be assigned a default weight. The weights may be adjustable, and each adjustment to one of the weights may result in a corresponding change to the other weights in the subset so that the combined weighting always equals 1.0. For example, six factors are selected, each factor may be assigned a default weight of 0.167. If the weight of one of the factors is considered by a user to be more important, then that weight may be adjusted by the user, say to 0.2. In this case, in response to adjusting the weight of one of the six factors from 0.167 to 0.25, the system may automatically adjust the weights of the other factors to 0.15 so that the weights of all of the selected factors combine to a total weight of 1.0. In this way, both the factors used and the importance of each factor may be a customizable parameter in the system.

In some examples, the computing device may compute electronic driver scorecards for different group of drivers, and an electronic driver scorecard may categorize the drivers according to a specified organizational grouping. In different examples, the specified organizational grouping may include one or more of a group consisting of: home office, a type of driver, a type of vehicle, a type of cargo, a corporate entity, a government entity, a nonprofit entity, a cooperative entity, a geographic location, a date of driver service, and a time of driver service. These groupings may also be selectable and configurable so as to allow the user to customize the scorecard.

In some examples, the computing device may evaluate drivers within a fleet relative to one another according to the specified safety and efficiency criteria, and, based on the evaluation, present a representation of the relative performances of the drivers within the fleet to a user. For example, a plurality of drivers may be listed according to their respective safety and efficiency ratings, or based on their overall alphanumeric score.

As shown in FIG. 12, performance tab 870 illustrates news feed 874, which may present articles that are not intended only for the user, such as industry-relevant information, weather reports or other information. In contrast, announcements 876, which is also shown in performance tab 870, may include information specifically intended for the user, such as internal company notifications or even messages uniquely addressed to the user. In addition, performance tab 870 also includes driver detail block 878. Driver detail block 878 includes identification and status information for the driver evaluated by scorecard 872. Driver detail block 878 also includes a selectable "View Log" tab, which allows a user to view the driver's detailed logs, e.g., as shown in FIG. 13.

FIG. 13 illustrates a user interface of a network device, such as computing device 700 (FIG. 7), presenting a detailed driving log 880 for a selected driver. In other examples, user interface 850 with detailed driving log 880 may be presented on a portable wireless data transfer and display device, such as computing device 750 (FIG. 7).

Driving log 880 includes a listing of the date, miles driven and total miles traveled (as with tandem driving). Driving log 880 also includes a listing of driver and vehicle information 882 corresponding to driving log 880. Further, driving log 880 includes a timeline 884 that graphically represents the time the driver spent for different driver statuses. As examples, driver statuses may include "off duty," "sleeper birth," "driving," and "on duty." More detailed information about the driver's activities for the day are included in events listing 886. Events listing 886 lists specified events, such as driver status changes and other events in reverse chronological order.

Figure 14:
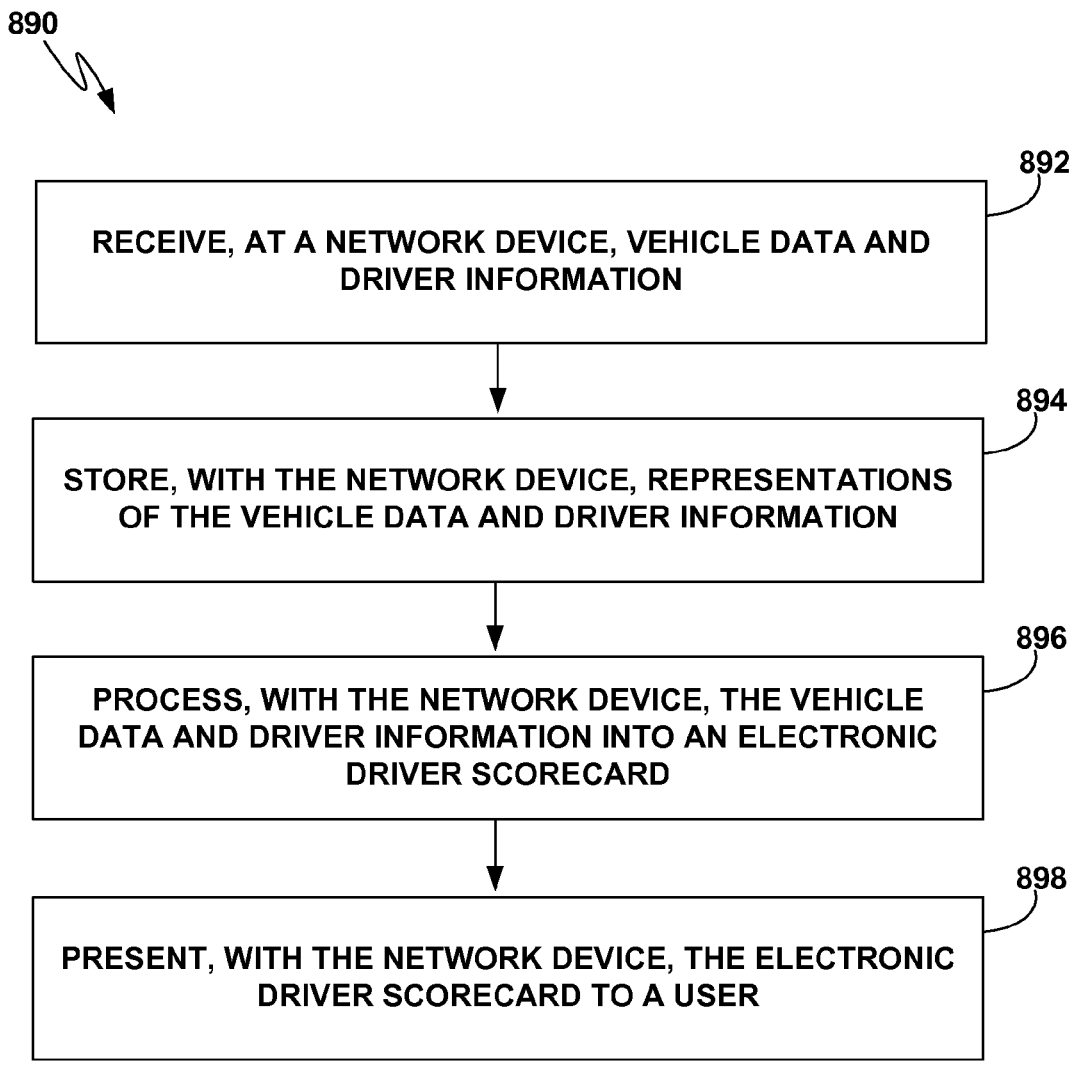
FIG. 14 is a flowchart illustrating example techniques for generating electronic driver scorecards.

FIG. 14 illustrates a process 890 for generating an electronic driver scorecard, such as electronic driver scorecard 872 (FIG. 12). First, a network device, such as computing device 700 (FIG. 7), receiving vehicle data and driver information via its network interface (892). For example, the network device may receive vehicle data and driver information from one or more portable wireless data transfer and display device, such as computing device 750 (FIG. 7). Then the network device stores the vehicle data and the driver information with in memory (894).

The network device processes the vehicle data and the driver information into an electronic driver scorecard according to specified safety and efficiency as described with respect to FIG. 12 (896). The network device may then present the electronic driver scorecard to a user (898). For example, the network device may then present the electronic driver scorecard to a user via a display of the network device or via a web module.

Figure 15:
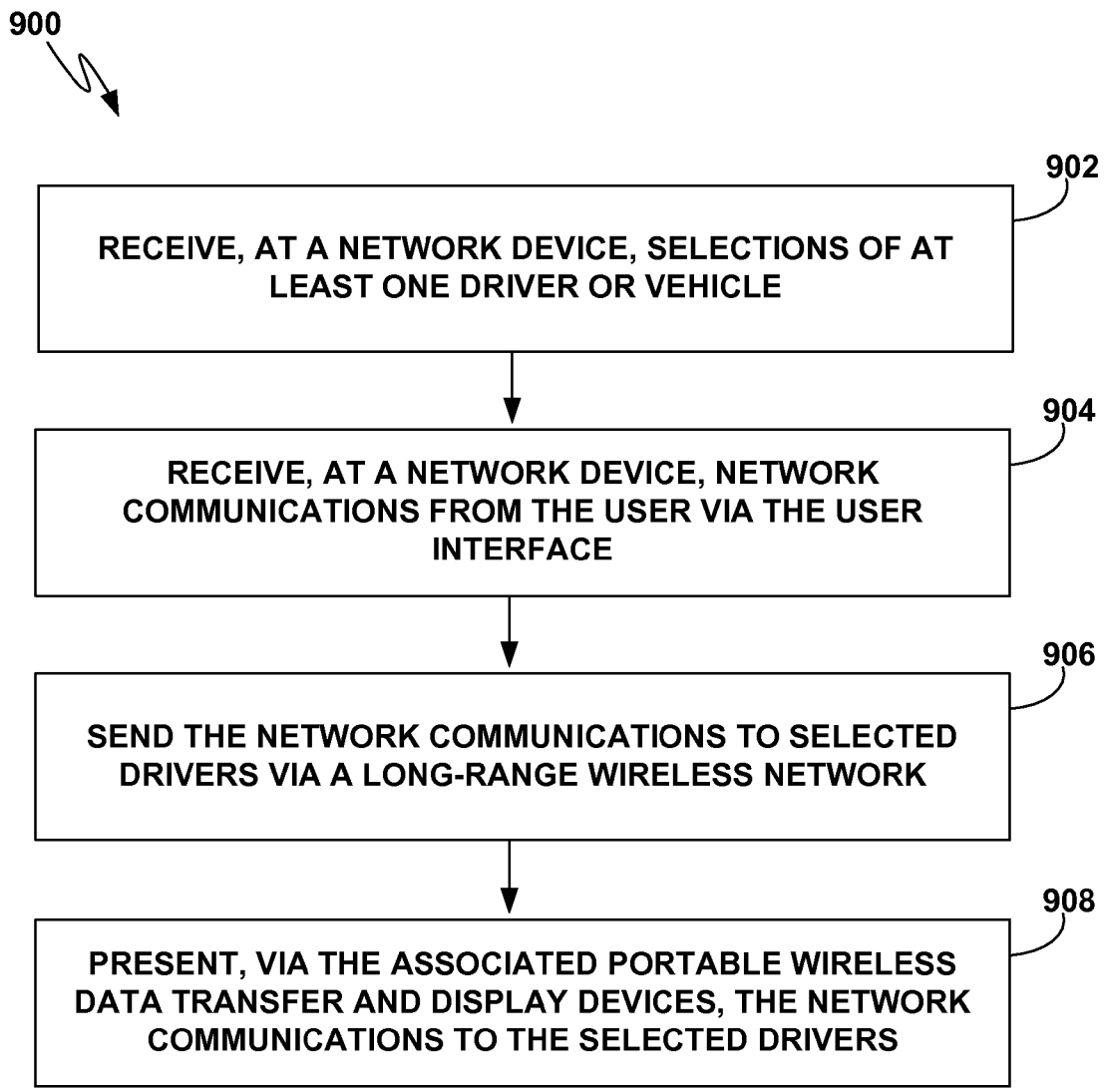
FIG. 15 is a flowchart illustrating example techniques for sending network communications to selected drivers via the plurality of portable wireless data transfer and display devices associated with those drivers via the long-range wireless network.

FIG. 15 illustrates a process 900 for sending network communications to selected drivers via the plurality of portable wireless data transfer and display devices associated with those drivers via the long-range wireless network.

A user interface of a network device, such as computing device 700 (FIG. 7), is configured to allow for selection of the drivers presented and is configured to accept user inputs of network communications via the user interface. For example, user interface 850 may accept user inputs of network communications via messaging tab 865 as described with respect to FIG. 11.

A user of the network device selects one or more drivers or vehicles (902). The user also inputs a network communication via the user interface of the network device (904). In different examples, such network communications may include one or more of: route information, destination information such as pictures, signatures, forms, landmark pictures, safety warnings, work requests, route changes or other information.

The network device then sends the network communications to portable wireless data transfer and display devices associated with the selected drivers or vehicles via a long-range wireless network, such as a cellular network (906). The portable wireless data transfer and display devices then present the network communications (908).

Figure 16:
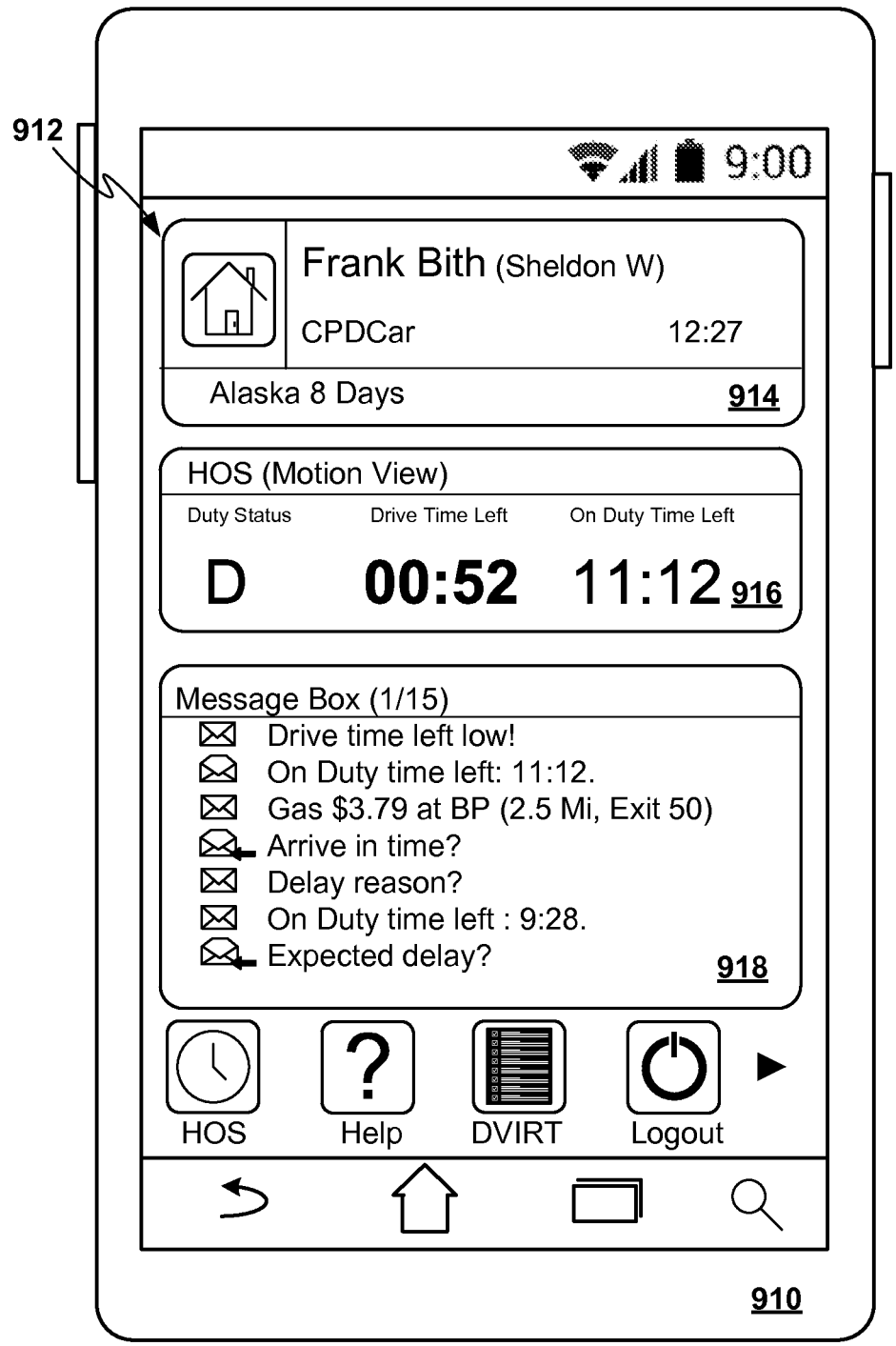
FIG. 16 illustrates a portable wireless data transfer and display device including a user interface presenting a variety of driver and vehicle information for a commercial driver.

FIG. 16 illustrates portable wireless data transfer and display device 910, which displays user interface 912 presenting a detailed driving log 880 for a selected driver. Portable wireless data transfer and display device 910 is a network device, such as computing device 750 (FIG. 7).

User interface 912 presents a variety of driver and vehicle information for a commercial driver with a number of display boxes. In particular, user interface 912 includes driver information box 914, which displays driver identification for the driver associated with portable wireless data transfer and display device 910. User interface 912 also includes driver hours of service box 916, which displays drive time, drive time left and on duty time left for the driver associated with portable wireless data transfer and display device 910.

User interface 912 further includes message box 918, which presents a variety of messages to the driver associated with portable wireless data transfer and display device 910. For example, such messages may include network communications from a user of a remote networking device, such as computing device 700 (FIG. 7). The messages may also include information useful for the driver, such as information relating to potential points of interest along the driver's route, e.g., gas stations and fuel prices, as well as informational warnings related to performance of the vehicle, e.g., scheduled or unscheduled maintenance issues, and informational notices related to compliance with governmental or company regulations, such as information related to hours of service and/or International Fuel Tax Association (IFTA) compliance. Such messages may be ordered according to their likely importance, presented in reverse chronological order or ordered according to a driver's selection. The delivery and presentation of messages to the driver may be completely automated and may be delivered only during times when the vehicle is stopped. In other examples, the user at the network device may configure the automated messages, e.g., by selecting the information type and/or the delivery times that messages are delivered to the driver. In some examples, message delivery may be limited to times when the vehicle is stationary, e.g., to promote safety.

In some examples, portable wireless data transfer and display device 910 may configured to generate a trip schedule using at least one of vehicle data, driver information, and the driver communications. Portable wireless data transfer and display device 910 may present in real-time, the trip schedule and the driver communications to the user via the display. Such a trip schedule may optionally include one or more of the following details: the driver's current location, destinations for the trip, times when they are expected to reach their destination, a time remaining to complete route, a trip route, a trip map, a time for which the driver may remain on duty, and/or one or more safety graphics, such as warnings for road construction or other hazards. In some examples, the trip schedule may be configurable by the user, e.g., allowing the user to select a sub-set of the factors listed above (or possibly other factors). The set of selectable factors may include some or all of the factors listed above. In other cases, some factors may be mandatory for any trip schedule, and other factors may be selectable. In these ways, the trip schedule that is delivered to the driver can be made configurable to the user of the system.

The trip schedule shown by the display may include, for example, the driver's current location, destinations for the trip, the times when they are expected to reach their destination, a time remaining to complete route, a trip route, a trip map, a time for which the driver may remain on duty, and one or more safety graphics. In some examples, the portable wireless data transfer and display device trip schedule may then be displayed on one or more areas separate from the list of the driver communications or in replacement of message box 918, for example. Again, the actual factors used in the trip schedule that is delivered to the driver can be made configurable to the user of the system. A system administrator key or password may be required in order to make changes to the configuration of the system (e.g., to re-configure the scorecard, to reconfigure the messages, to reconfigure the trip schedule, or to reconfigure other selectable and adaptable parameters of the system.

In still other cases, however, some or the entire scorecard, messages and schedule can all be fixed and non-adaptable by users. For example it may be desirable to present a homogenous system to multiple users. In particular, it may be desirable to fix the factors and weights associated with the alphanumeric score, in which case, a driver's relative score may be determined across multiple drivers associated with multiple users. If the alphanumeric score were standardized across multiple users, a raw score may be accompanied or replaced by a relative score that identifies the driver's relative performance, as compared to other drivers. The relative score may be relative to other drivers associated with a given user, or if the factors (and weights if weights are used) are standardized across multiple users, the relative score could be presented relative to drivers associated with multiple users, which may present a larger sample of drivers for comparison.

Figure 17:
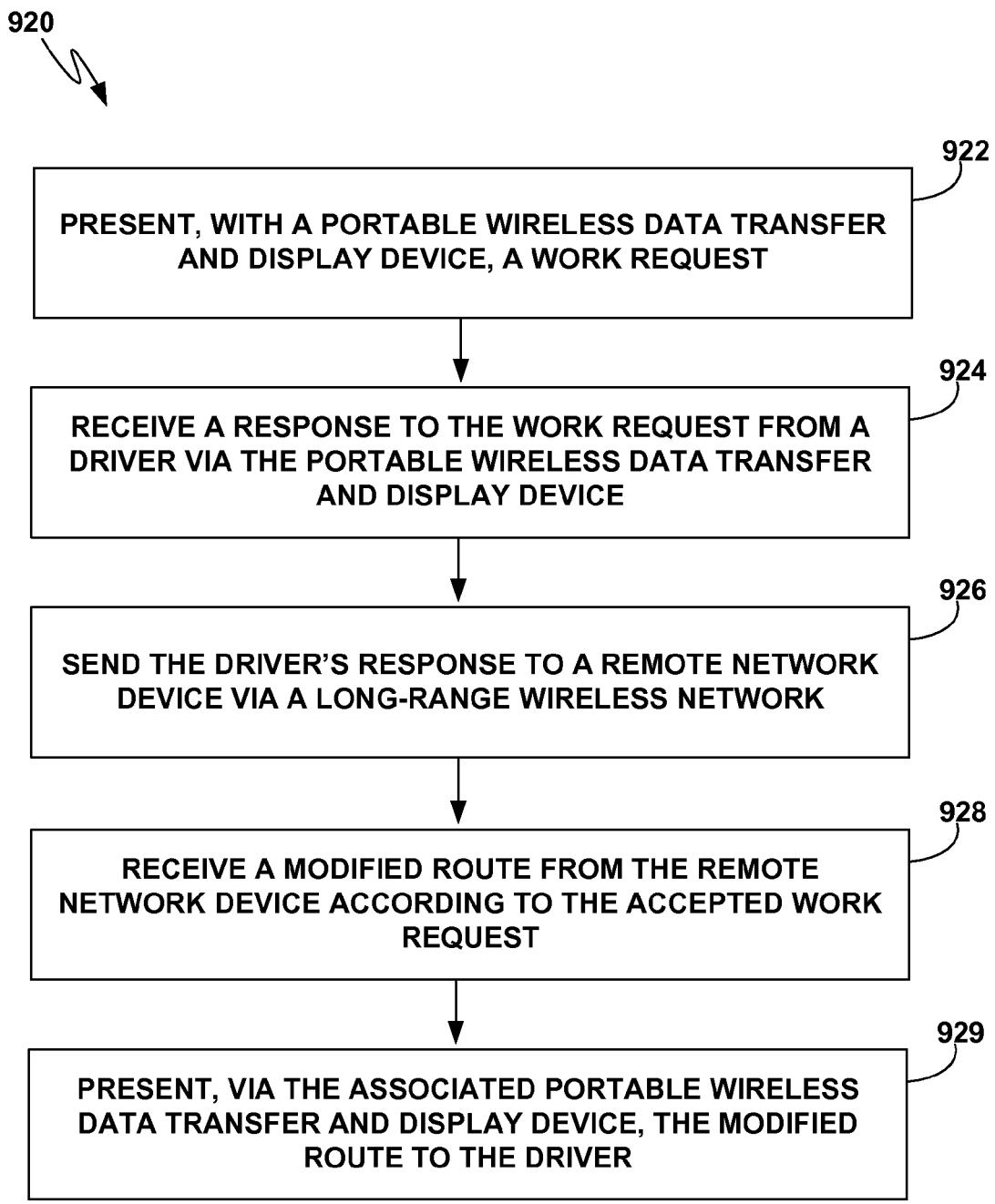
FIG. 17 is a flowchart illustrating example techniques for presenting work requests to a commercial driver via a portable wireless data transfer and display device.

FIG. 17 illustrates a process 920 for presenting work requests to a commercial driver via a portable wireless data transfer and display device, such as portable wireless data transfer and display device 910 (FIG. 16).

The portable wireless data transfer and display device presents a network communication including the work request, e.g., via message box 918 (922). The portable wireless data transfer and display device may then accept an input from a driver responding to the work request via the user interface (924). In some examples, the portable wireless data transfer and display device may facilitate a driver's response to the work request with a single input, such as a button or touch-screen input.

The portable wireless data transfer and display device may forward the driver's response to the network device via the long-range wireless network (926). In the event that the driver accepted the work request, the network device forwards an indication a modified route for the driver (928). In some examples, the network device may send the modified route itself to the portable wireless data transfer and display device; in other examples, the portable wireless data transfer and display device may calculate the modified route according to updated route parameters and/or input from the driver or another user. The portable wireless data transfer and display device may then present the modified route via its display (929).

In some examples, a portable wireless data transfer and display device may provide limited functionality when it determines a vehicle is in operation or when it more specifically determines that its associated driver is operating a vehicle. A portable wireless data transfer and display device may determine the operational status of the vehicle and its associated driver via GPS signals, vehicle information, driver input, network communications or using any other information source provided to the portable wireless data transfer and display device as discussed herein or otherwise.

In some examples, portable wireless data transfer and display device may communicate only via sound, e.g., it may interact with the driver using voice communications. In other examples, the portable wireless data transfer and display device may not accept and driver input, but may nonetheless continue to display information, such as route information, driver information and/or vehicle information automatically. In other examples, the portable wireless data transfer and display device may only provide important notifications. In yet another example, the portable wireless data transfer and display device may cease to interact when the vehicle is in operation.

In some examples, the portable wireless data transfer and display device may adjust the parameters of limited functionality according to the location or other operational parameter of the vehicle, e.g., in order to comply with local regulations and/or company policies.

In some examples, the systems and techniques described herein may provide one or more of the following benefits. As one example, a system for communicating vehicle information may provide a data acquisition device mountable in a vehicle and a mobile communication device, e.g., a cellular phone that is configured to provide wireless communication with the data acquisition device. As such, system may include a plurality of separately housed devices that are each configured to output electronic reports in different manners.

In some examples, a data acquisition device may be equipped with an external data port, e.g., a USB connection port, so that the data acquisition device may output electronic reports or other electronic files via a hardwired connection to a remote computer. For example, a vehicle inspector may carry a portable computer device or portable storage device, and the driver, the inspector may plug the inspector's device into the data port of the data acquisition device so as to retrieve an electronic report, or other electronic files via a hardwired connection to the unit mounted in the vehicle.

In some examples, a system may provide a mobile communication device, e.g., a cellular phone, that provides short-range, two wireless communication with a data acquisition device mounted in a vehicle. In such circumstances, not only does the data acquisition device wirelessly communicate information to the mobile communication device, but the mobile communication device may also transmit information back to the data acquisition device. Therefore, one or more electronic files containing vehicle or driver information may be synced between the two separate devices for purposes of outputting the files in a number of optional manners. Furthermore, the mobile communication device may communicate electronic files containing vehicle or driver information to other mobile communication devices, remote computer(s), server(s), and other wireless displays.

In some examples, a data acquisition device mounted in the vehicle may be constructed as a display-less unit that is free of any user interface display. Such a construction may reduce the size of the data acquisition device, provide for simplified installation (and, in some examples, concealed installation inside the vehicle), and reduce the manufacturing complexities for the data acquisition device. In these circumstances, the user interface of the mobile communication device may serve as the user interface for the system (including the data acquisition device). As such, the mobile communication device may be separately housed from its corresponding data acquisition device so that the mobile communication device may be carried by the vehicle driver or other user outside of the vehicle while the data acquisition device remains mounted inside the vehicle. Moreover, because the mobile communication device is portable relative to its respective data acquisition device, the driver may view or input vehicle or driver information on the user interface of the mobile communication device both when the driver is seated inside the vehicle and when the driver positioned outside the vehicle in proximity thereto, e.g., while inspecting the exterior of the vehicle, refueling, or sitting in a nearby building. Furthermore, the driver may communicate through the mobile communication device with other devices connected to the network while the mobile device and driver are out of proximity required for short-range communication with the data acquisition device.

In some examples, a data acquisition device may be configured to detect the particular type of communications protocol employed by the vehicle, and automatically adapt to the detected protocol in order to communicate with an engine control module of the vehicle. As such, the data acquisition device may be installed in any one of a number of different types of vehicles, and the installer's act of connecting the data acquisition device to the vehicle's engine control module may prompt the control circuitry of the data acquisition device to automatically recognize the type of vehicle in which it is installed. In some examples, this protocol information may be further transmitted to a mobile communication device or portable wireless data transfer and display device, which may than communicate this information to other devices connected to the network.

In some examples, a data acquisition device may house one or more accelerometers therein so as to detect particular types of vehicle movement, such as hard brakes, acceleration, and lane changes. Instances of this type of vehicle movement may be recorded by the data acquisition device and communicated to a control center, e.g., via the mobile communication device, for purposes of safety monitoring by a fleet manager or other system user. This information may further be transmitted in real-time for better safety.

A number of examples have been described. Nevertheless, it may be understood that various modifications may be made without departing from the spirit and scope of this disclosure. For example, various forms of the flowcharts shown above may be used, with steps re-ordered, added, or removed. Also, although several applications of the systems and methods have been described, it should be recognized that numerous other applications are contemplated. For example, although the techniques have been described in the context of road-based vehicles, the techniques may also be used with other transportation devices such as trains, planes, boats, or other transportation devices used for transportation of passengers and cargo.

Various examples have been described by way of this description and the accompanying figures. These and other examples are within the scope of the following claims.

What is claimed is:

1. A portable wireless data transfer and display device comprising:
 a user interface;
 a communication module;
 a display;
 a short-range wireless communication module configured to wirelessly receive vehicle data from a data acquisition device mounted inside a vehicle when in close proximity to the data acquisition device, wherein the data acquisition device is in communication with an engine control module of the vehicle and automatically adapts to a detected type of communication protocol employed by the engine control module, wherein the portable wireless data transfer and display device is configured to accept inputs of driver information from a user via the user interface; and a long-range wireless communication module configured to send the vehicle data and the driver information through the communication module in real-time or at intervals that approximate real-time to a remote network device via a long-range wireless network, wherein the portable wireless data transfer and display device is further configured to present at least one of: the vehicle data, the driver information, processed data, driver communications to the user via the display.

2. The device of claim 1, wherein the portable wireless data transfer and display device is configured to wirelessly communicate the vehicle data, the driver information, and the driver summary electronic report with at least one remote network device or other portable wireless data transfer and display device via the long-range wireless communication module.

3. The device of claim 1, wherein one or more of the elements of the portable wireless data transfer and display device comprises cellular phone device that displays hours of service information, the hours of service information being updated in response to wirelessly receiving vehicle usage information from the data acquisition device.

4. The device of claim 1, wherein the short-range wireless communication module is a Bluetooth wireless communication module.

5. The device of claim 1, wherein the data acquisition device and the portable wireless data transfer and display device provide two-way wireless communication such that the portable wireless data transfer and display device wirelessly receives at least the vehicle usage information from the data acquisition device via the short-range wireless communication module and the data acquisition device wirelessly sends confirmation of receipt of the vehicle usage information to the portable wireless display unit.

6. The device of claim 1, wherein the portable wireless data transfer and display device wirelessly communicates via the short range wireless communication module, at predetermined times, with the data acquisition device when the data acquisition device is mounted in the vehicle and the portable wireless data transfer and display device is in close proximity to the vehicle.

7. The device of claim 1, wherein the long-range wireless network is selected from a group consisting of:
a cellular network;
a satellite communication link;
a worldwide interoperability for microwave access (WiMax) link; and
a long term evolution (LTE) network.

8. The device of claim 1, wherein the portable wireless data transfer and display device is further configured to receive processed data via the communication module from the remote network device via the long-range wireless network.

9. The device of claim 1, wherein the portable wireless data transfer and display device is further configured to send driver communications via a communication module to at least one of: other portable wireless data transfer and display device, remote computer via the long-range wireless network.

10. The device of claim 1, wherein the portable wireless data transfer and display device is further configured to receive driver communication via the communication module from at least one of: other portable wireless data transfer and display device, remote computer via the long-range wireless network.

11. The device of claim 1, further comprising an installation module configured to download and independently install configuration updates from the remote network device.

12. The device of claim 1, further comprising a memory configured to store vehicle data, driver information, driver communications, processed data, and remote network device updates.

13. The device of claim 1, further comprising a processor configured to process vehicle information and driver data a driver summary electronic report.

14. The device of claim 13, wherein the portable wireless is configured to wirelessly transmit the electronic report to a remote computer via a wireless network.

15. The device of claim 1, wherein the intervals that approximate real-time are selected from a group consisting of:
intervals less than 5 minutes;
intervals less than 3 minutes;
intervals less than 2 minutes;
intervals less than 1 minute; and
intervals less than 30 seconds.

16. A device comprising:
a means for wirelessly receiving vehicle data from a data acquisition device mounted inside a vehicle when in close proximity to the data acquisition device, wherein the data acquisition device is in communication with an engine control module of the vehicle and automatically adapts to a detected type of communication protocol employed by the engine control module;
a means for accepting inputs of driver information from a user;
a means for sending the vehicle data and the driver information through the communication module in real-time or at intervals that approximate real-time to a remote network device via a long-range wireless network; and
a means for presenting at least one of: the vehicle data, the driver information, processed data, driver communications to the user.

17. The device of claim 16, wherein the device and the data acquisition device provide two-way wireless communication such that the device wirelessly receives at least the vehicle usage information from the data acquisition device via the short-range wireless communication module and the data acquisition device wirelessly sends confirmation of receipt of the vehicle usage information to the device.

18. The device of claim 16, further comprising a means for communicating, at predetermined times, with the data acquisition device when the data acquisition device is mounted in the vehicle and the device is in close proximity to the vehicle.

19. The device of claim 16, further comprising a processor configured to process vehicle information and driver data a driver summary electronic report.

20. The device of claim 16, wherein the intervals that approximate real-time are selected from a group consisting of:
intervals less than 5 minutes;
intervals less than 3 minutes;
intervals less than 2 minutes;
intervals less than 1 minute; and
intervals less than 30 seconds.

* * * * *